Aug. 16, 1938.  O. N. TEVANDER  2,126,840
BOTTLE CAPPING MACHINE
Original Filed Aug. 4, 1933    21 Sheets-Sheet 5
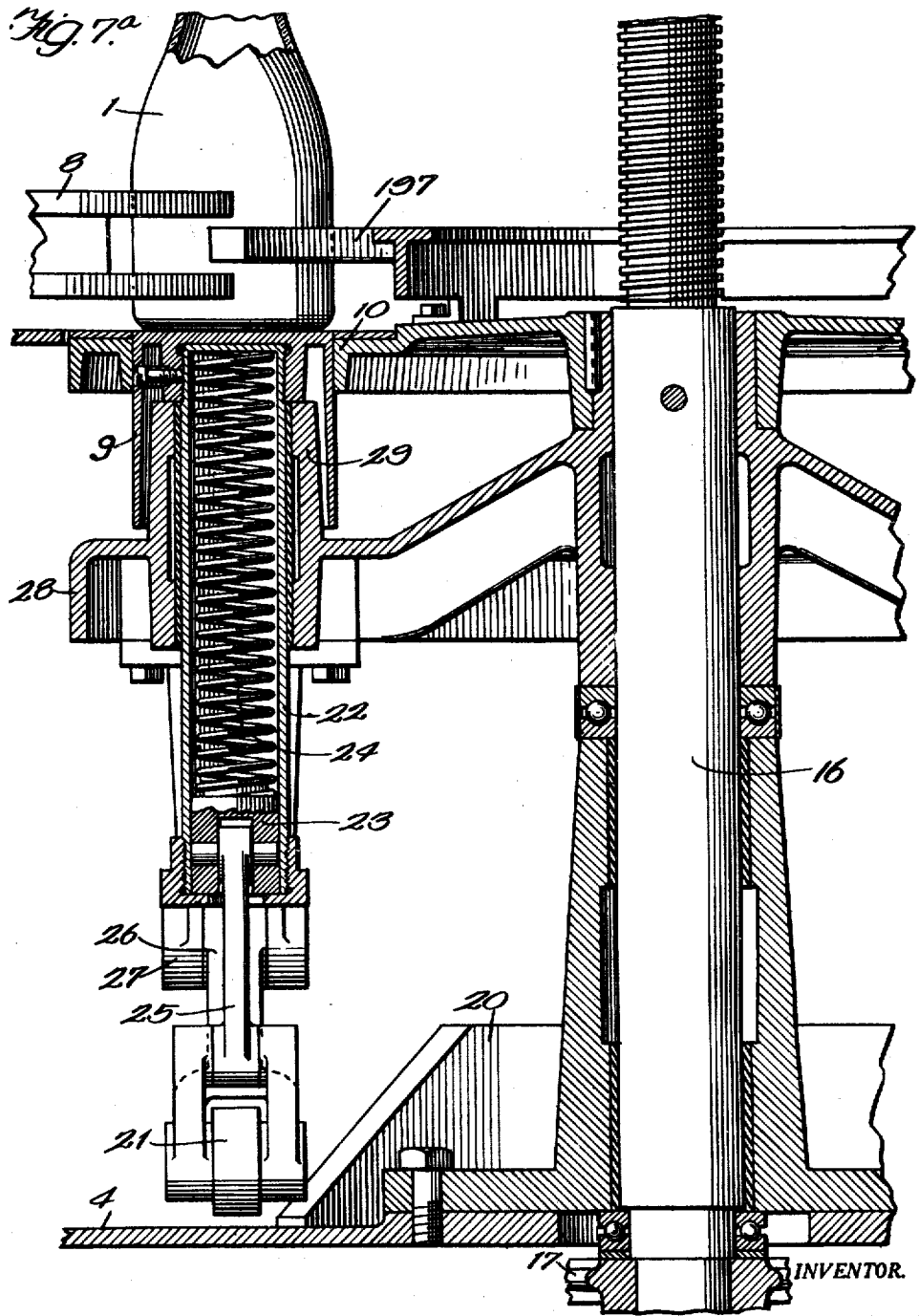
INVENTOR.
BY OLOF N. TEVANDER
ATTORNEYS.

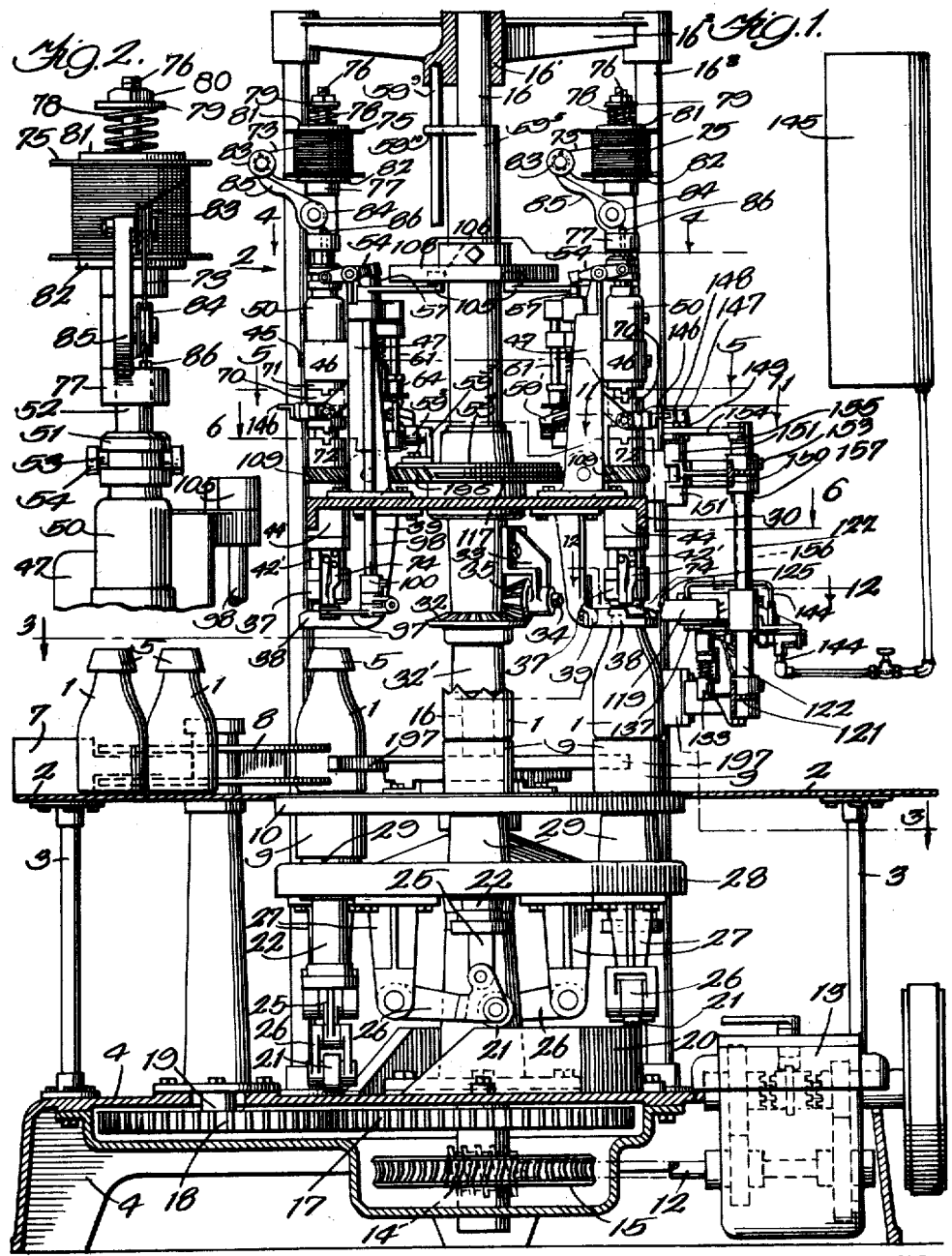

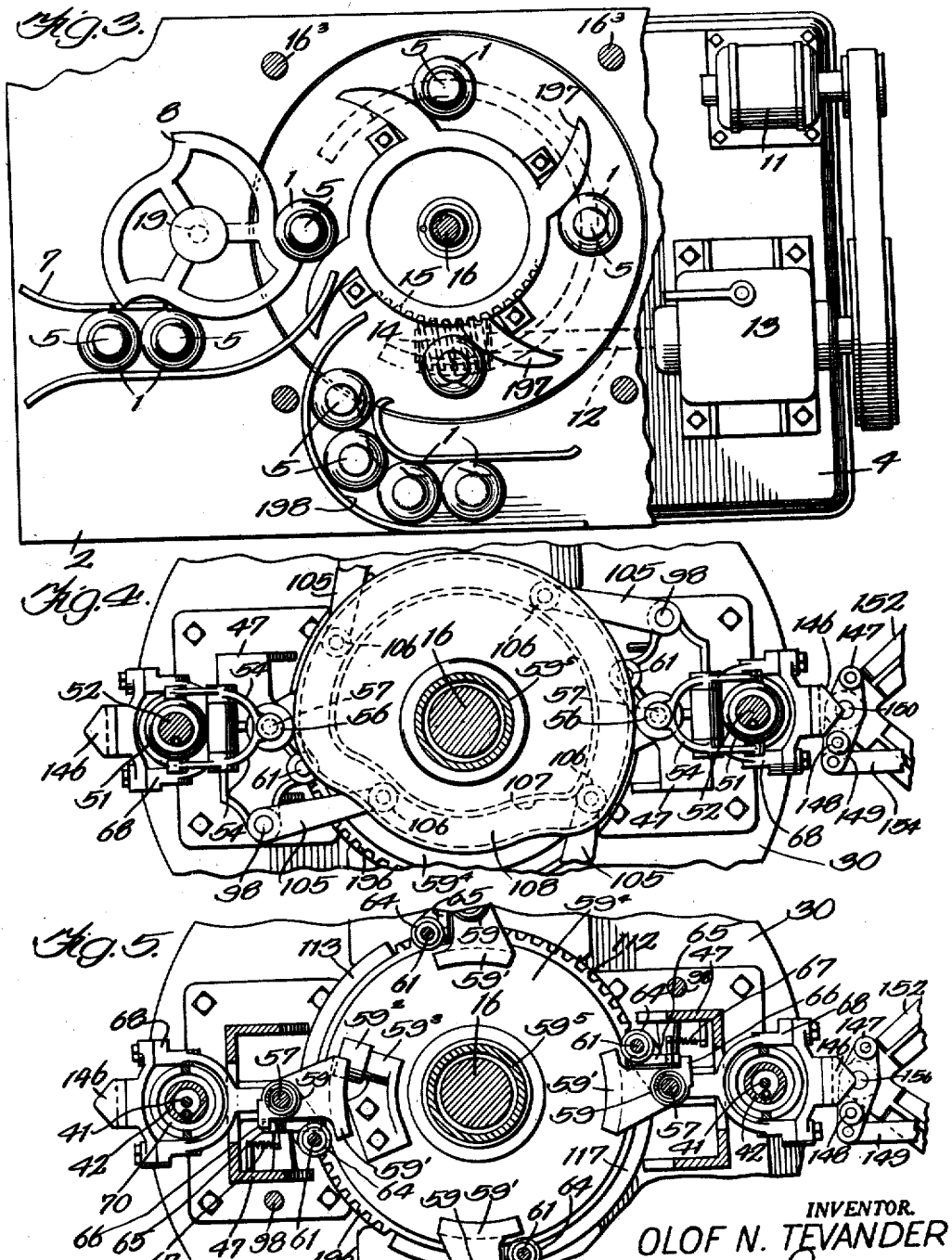

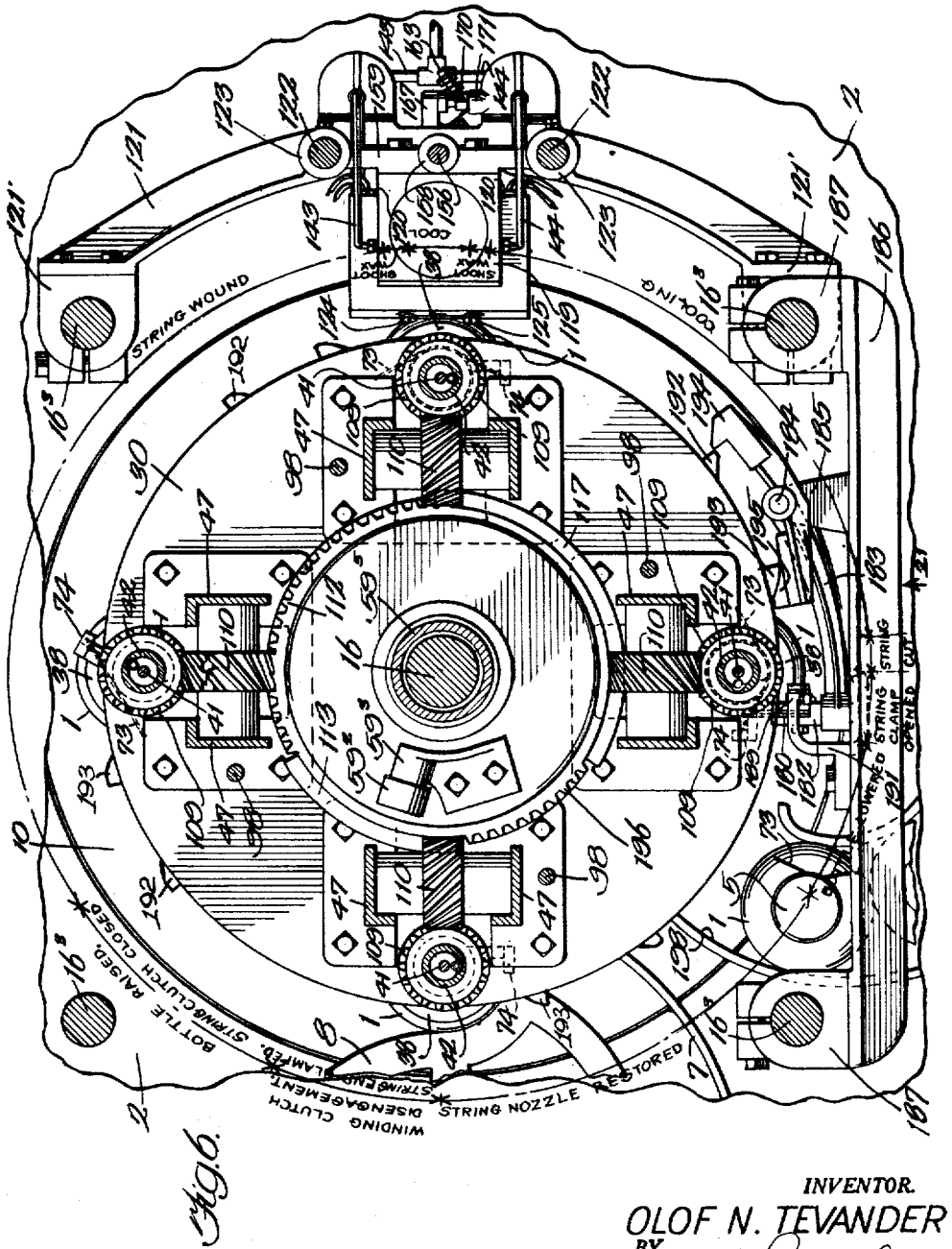

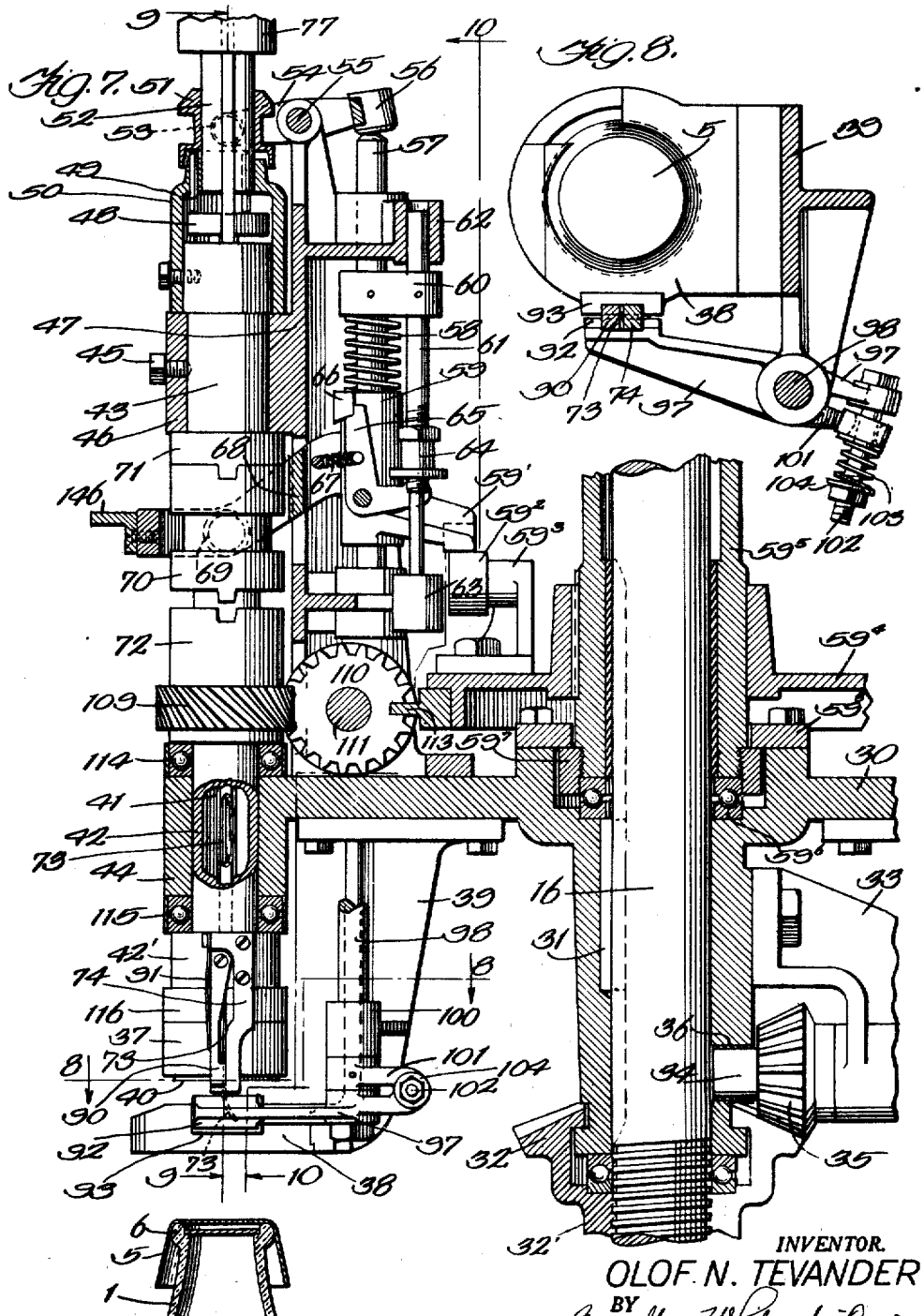

Aug. 16, 1938.   O. N. TEVANDER   2,126,840
BOTTLE CAPPING MACHINE
Original Filed Aug. 4, 1933   21 Sheets-Sheet 6
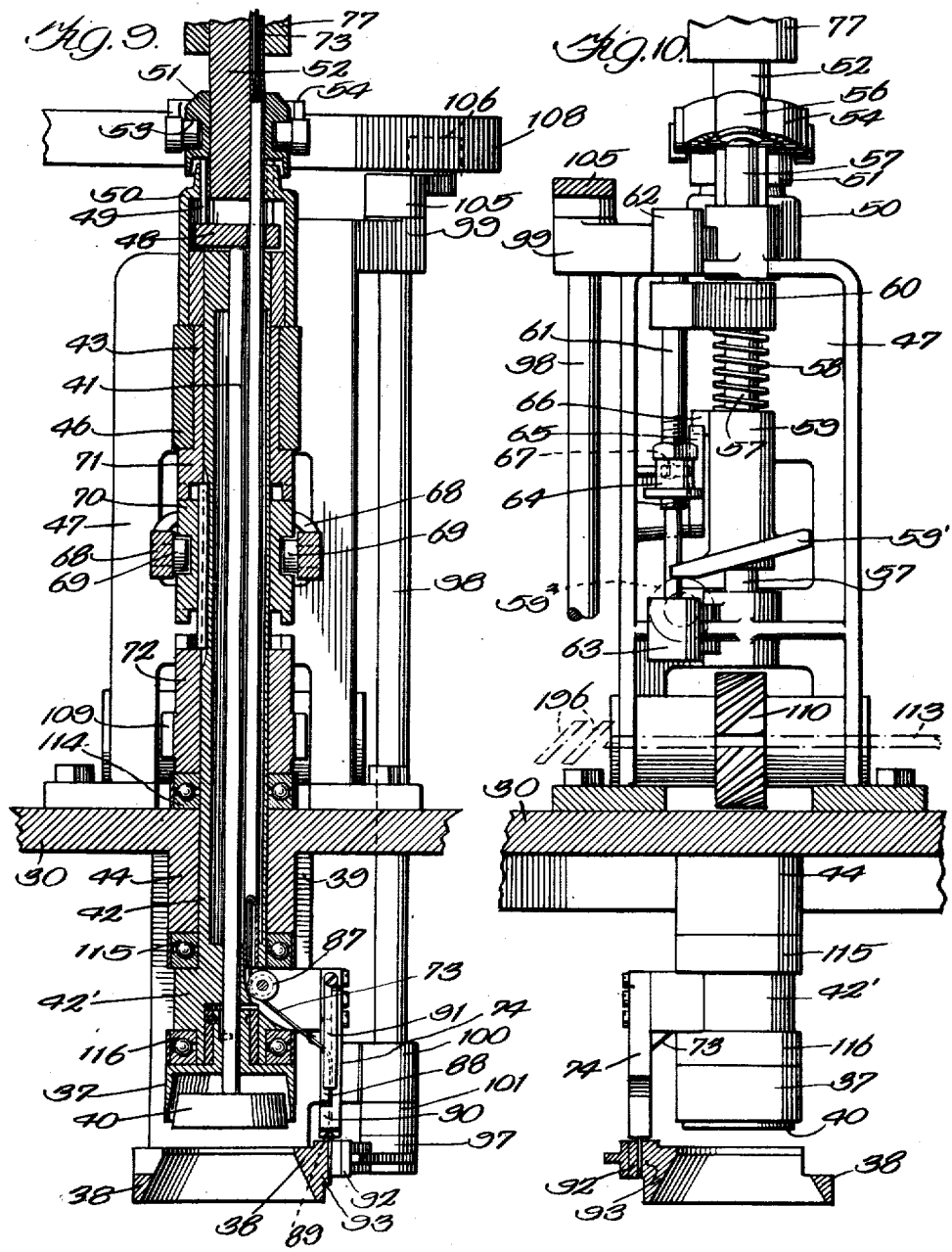
INVENTOR.
OLOF N. TEVANDER
BY Braselton, Whitcomb & Davies
ATTORNEYS.

Aug. 16, 1938.   O. N. TEVANDER   2,126,840
BOTTLE CAPPING MACHINE
Original Filed Aug. 4, 1933   21 Sheets-Sheet 7

INVENTOR.
OLOF N. TEVANDER
BY
Braselton, Whitcomb Davies
ATTORNEYS.

Aug. 16, 1938.    O. N. TEVANDER    2,126,840
BOTTLE CAPPING MACHINE
Original Filed Aug. 4, 1933    21 Sheets-Sheet 8
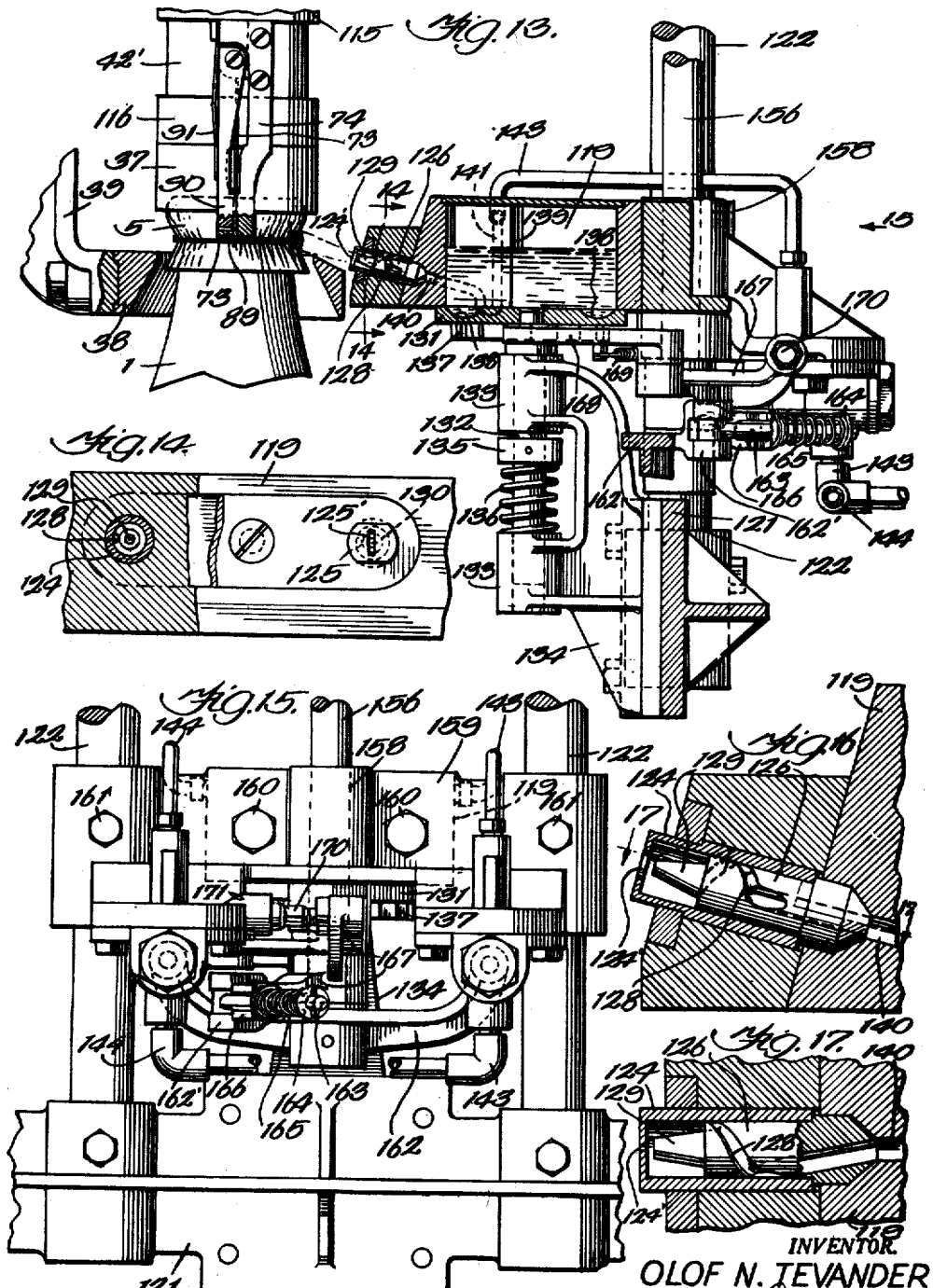
INVENTOR.
OLOF N. TEVANDER
BY
Braselton, Whitcomb Davies
ATTORNEYS.

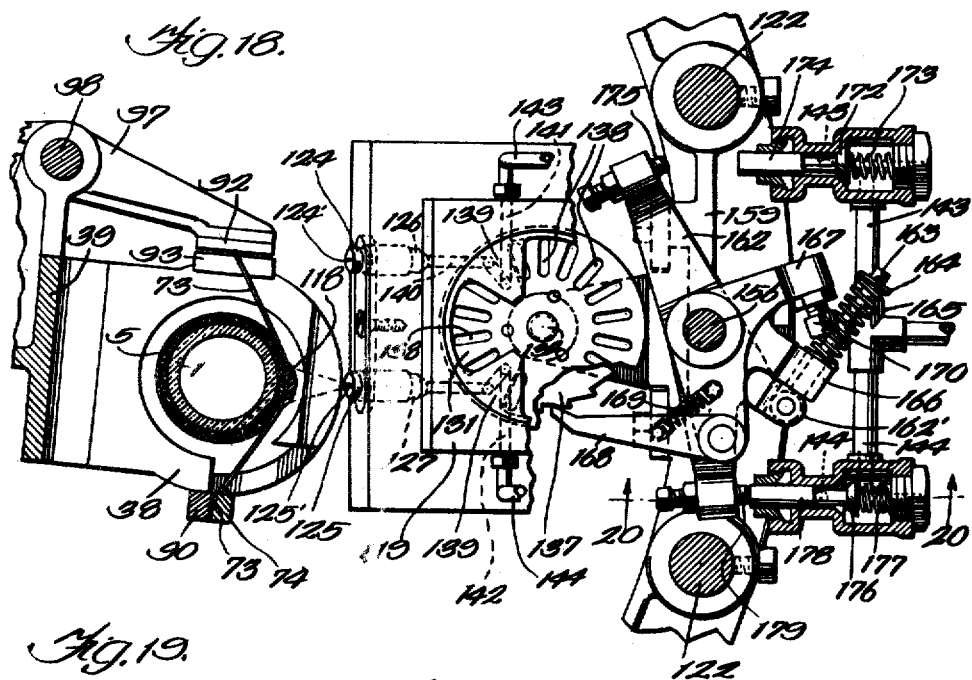

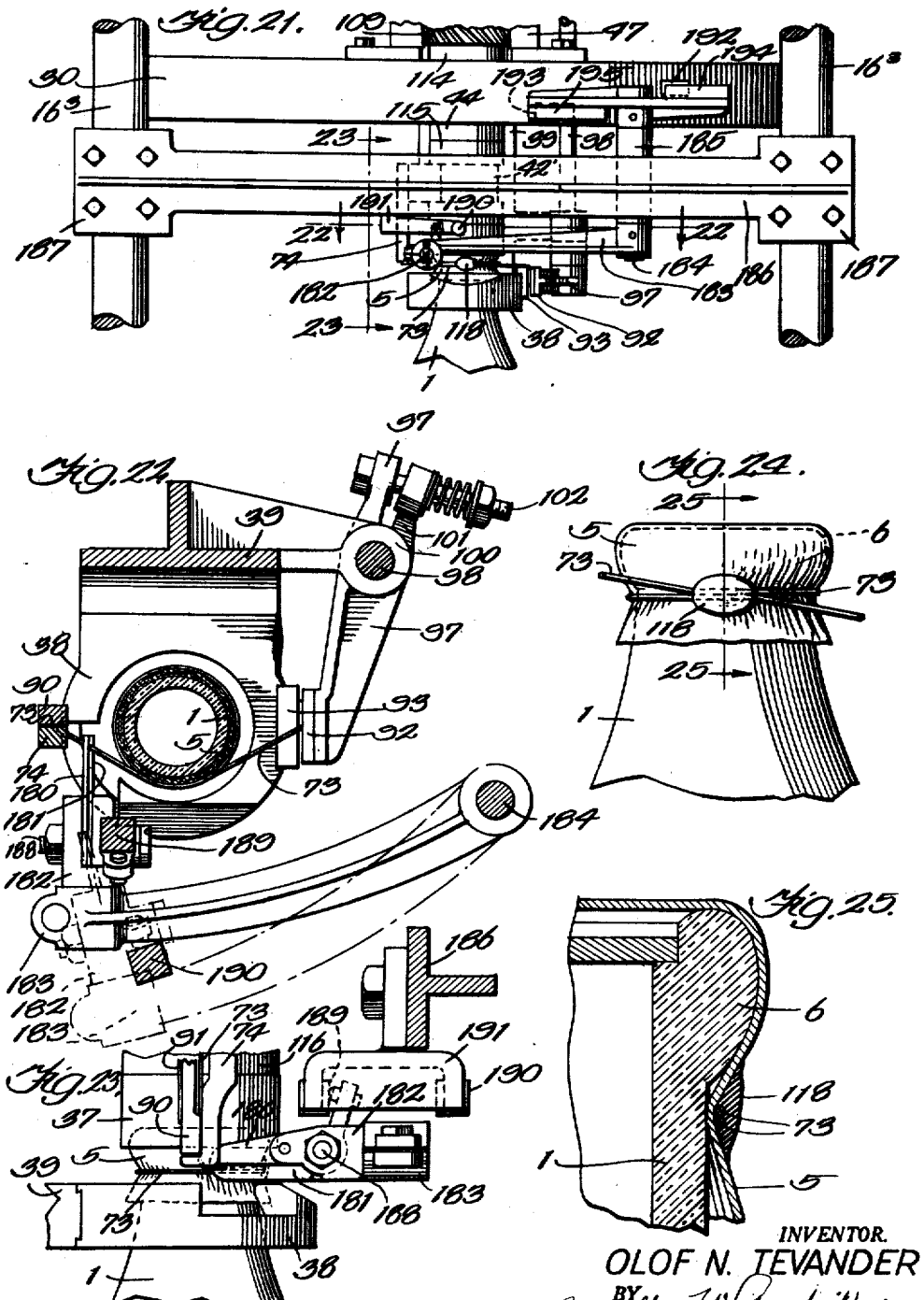

Aug. 16, 1938.  O. N. TEVANDER  2,126,840
BOTTLE CAPPING MACHINE
Original Filed Aug. 4, 1933   21 Sheets-Sheet 11
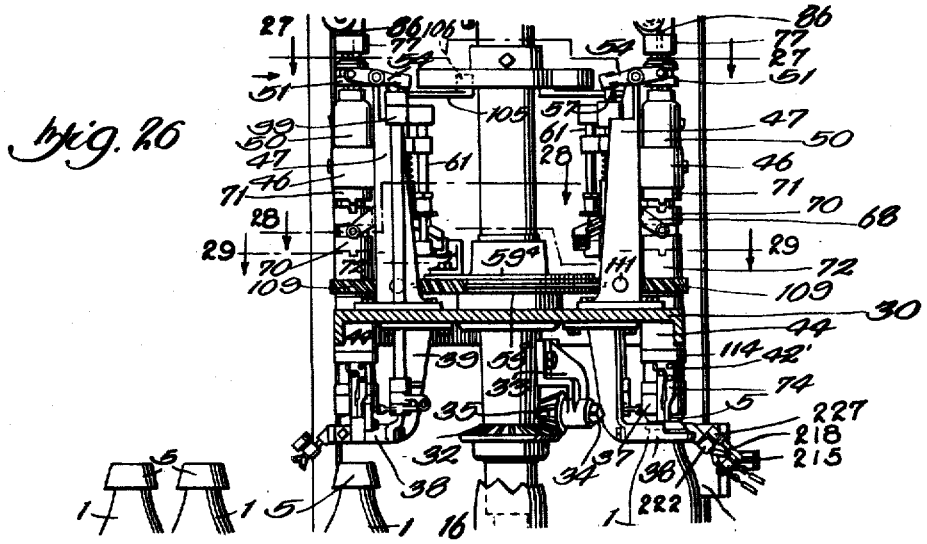
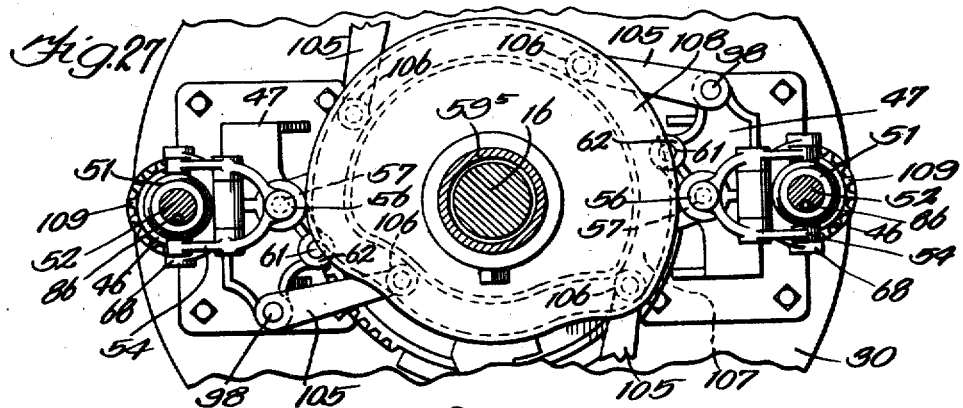
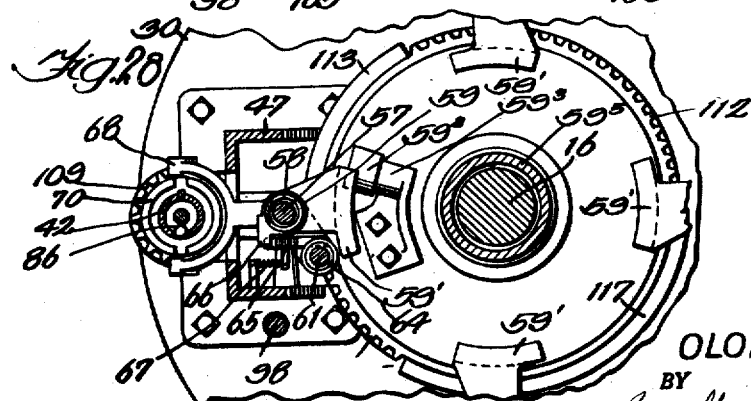
INVENTOR.
OLOF N. TEVANDER
BY
Braselton, Whitcomb Davies
ATTORNEYS.

Aug. 16, 1938.　　　　O. N. TEVANDER　　　　2,126,840
BOTTLE CAPPING MACHINE
Original Filed Aug. 4, 1933　　21 Sheets—Sheet 12

INVENTOR.
OLOF N. TEVANDER
BY
Braselton, Whitcomb & Davies
ATTORNEYS.

Aug. 16, 1938.  O. N. TEVANDER  2,126,840
BOTTLE CAPPING MACHINE
Original Filed Aug. 4, 1933  21 Sheets-Sheet 13

INVENTOR.
OLOF N. TEVANDER
BY
Braselton, Whitcomb & Daires
ATTORNEYS.

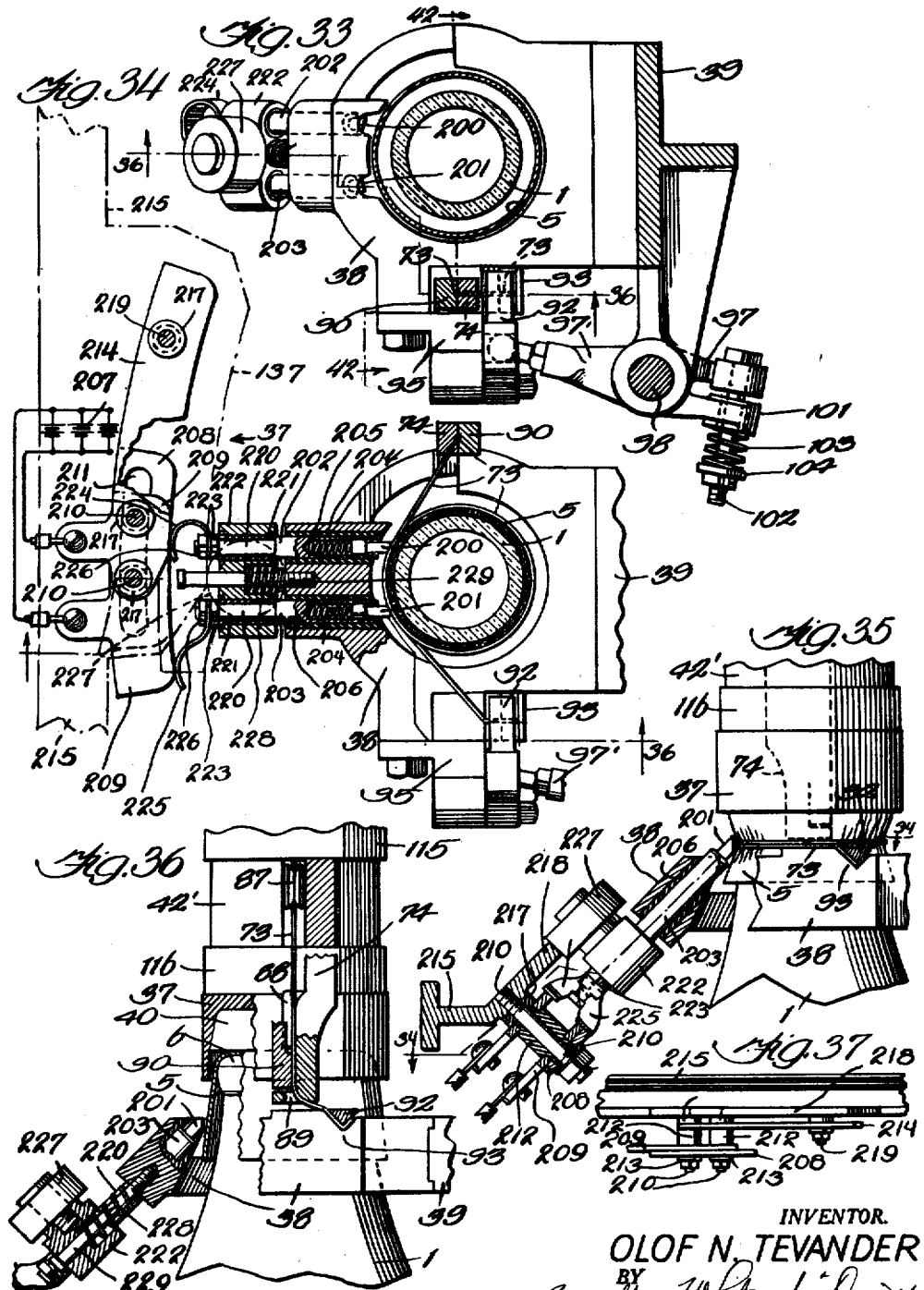

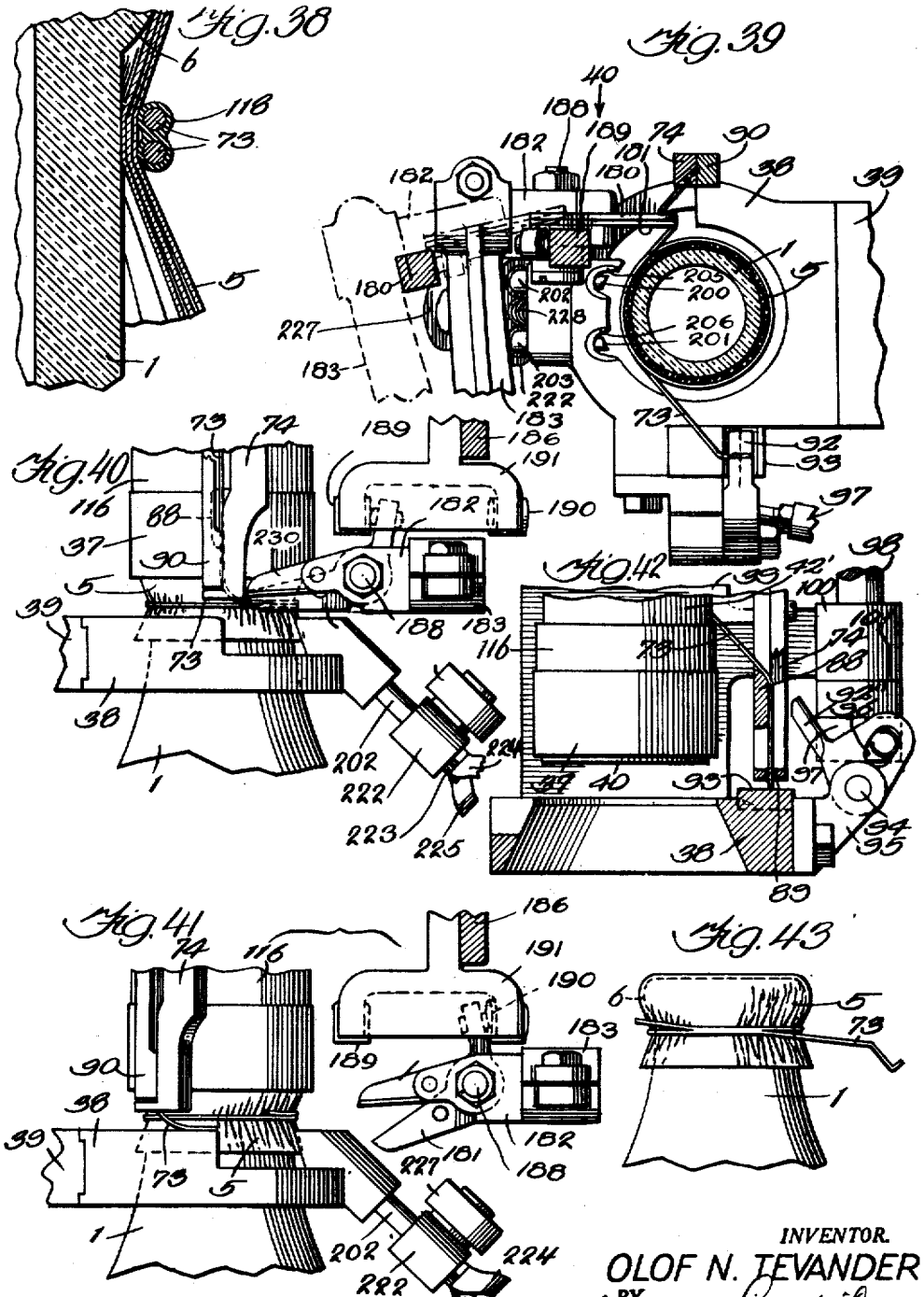

Aug. 16, 1938.   O. N. TEVANDER   2,126,840
BOTTLE CAPPING MACHINE
Original Filed Aug. 4, 1933   21 Sheets-Sheet 16
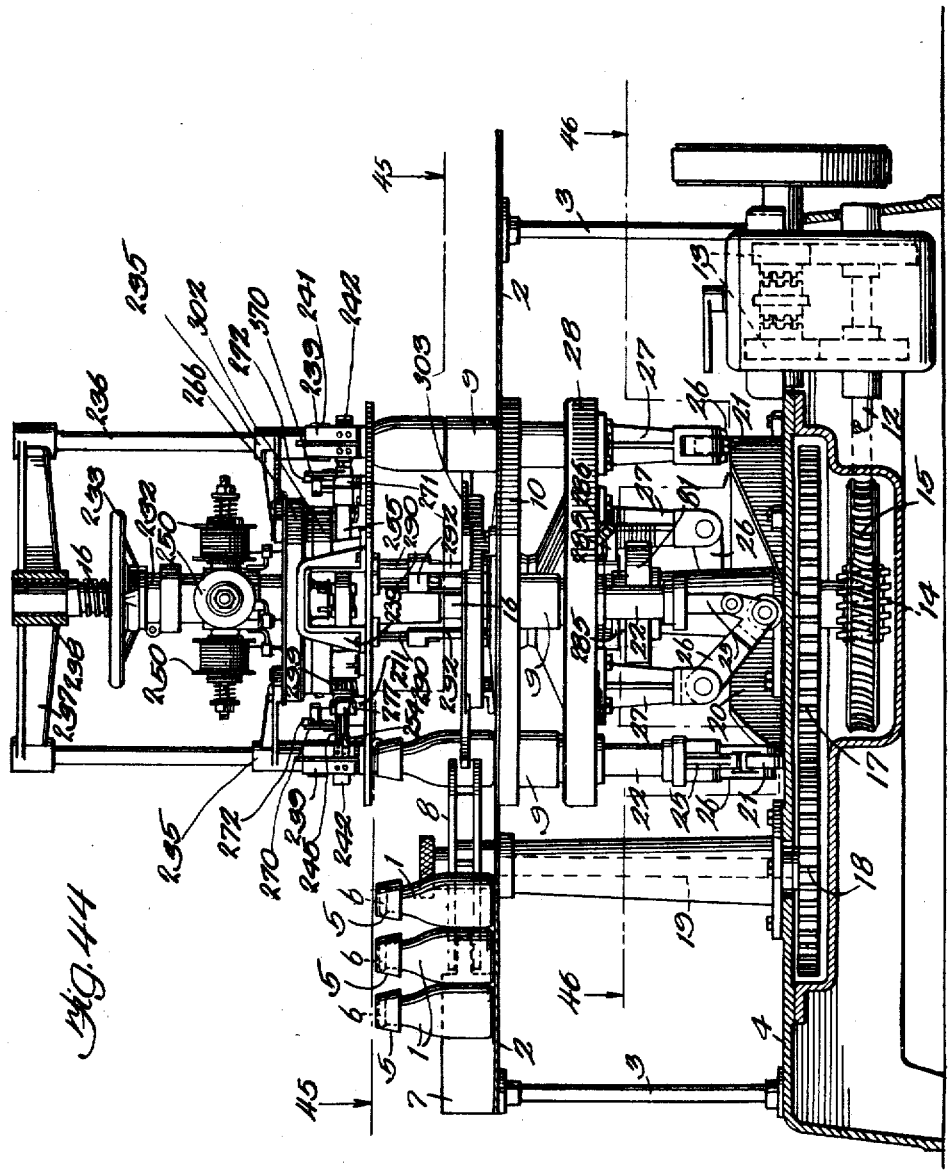
INVENTOR.
OLOF N. TEVANDER
BY
Braselton, Whitcomb Davies.
ATTORNEYS.

Aug. 16, 1938.  O. N. TEVANDER  2,126,840
BOTTLE CAPPING MACHINE
Original Filed Aug. 4, 1933   21 Sheets-Sheet 17
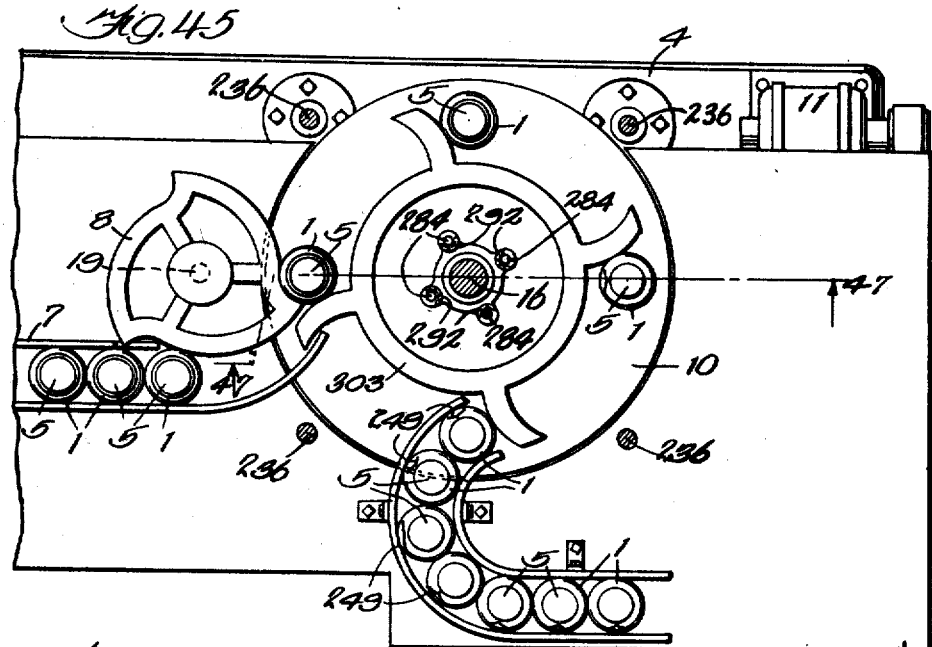
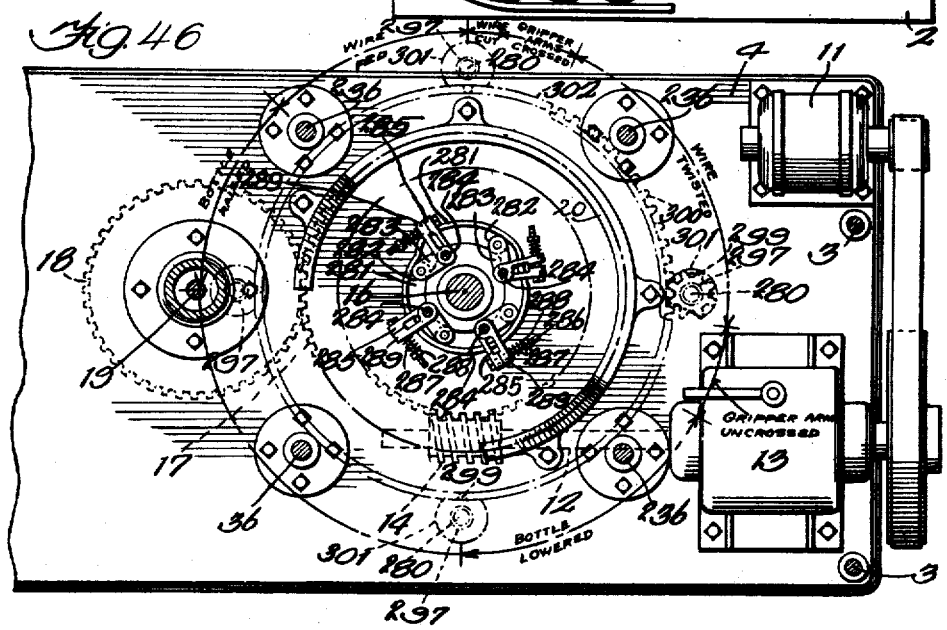
INVENTOR.
OLOF N. TEVANDER
BY
Braselton, Whitcomb Davies
ATTORNEYS.

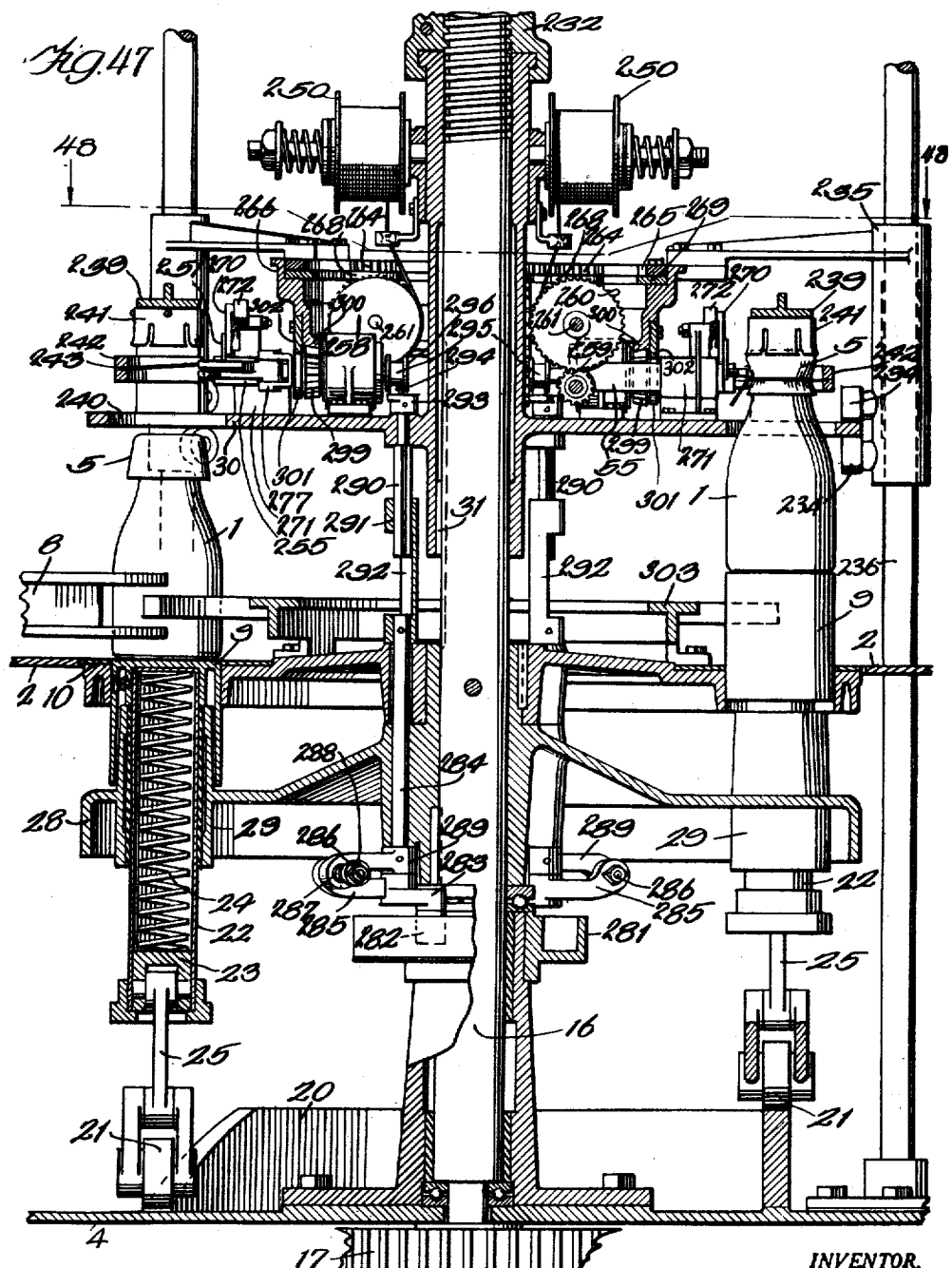

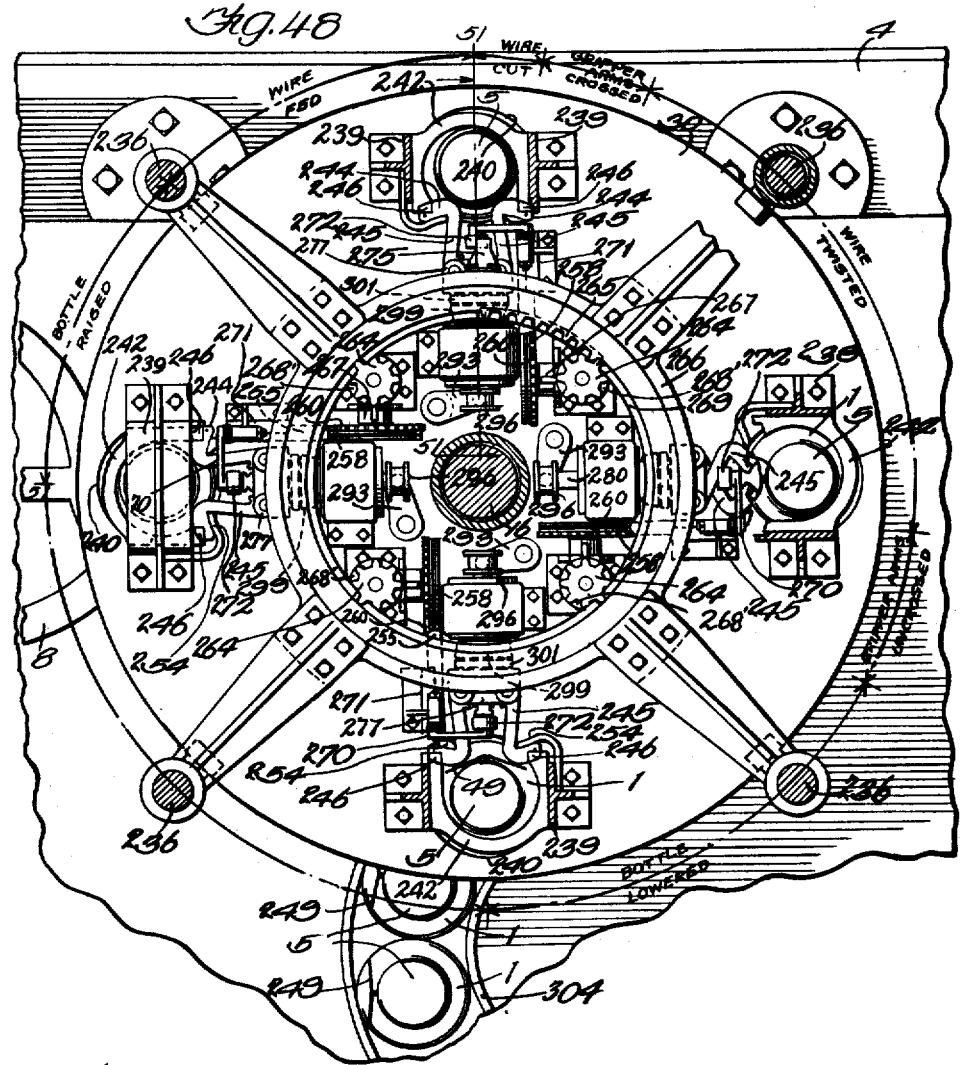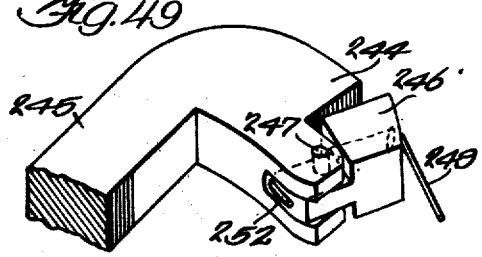

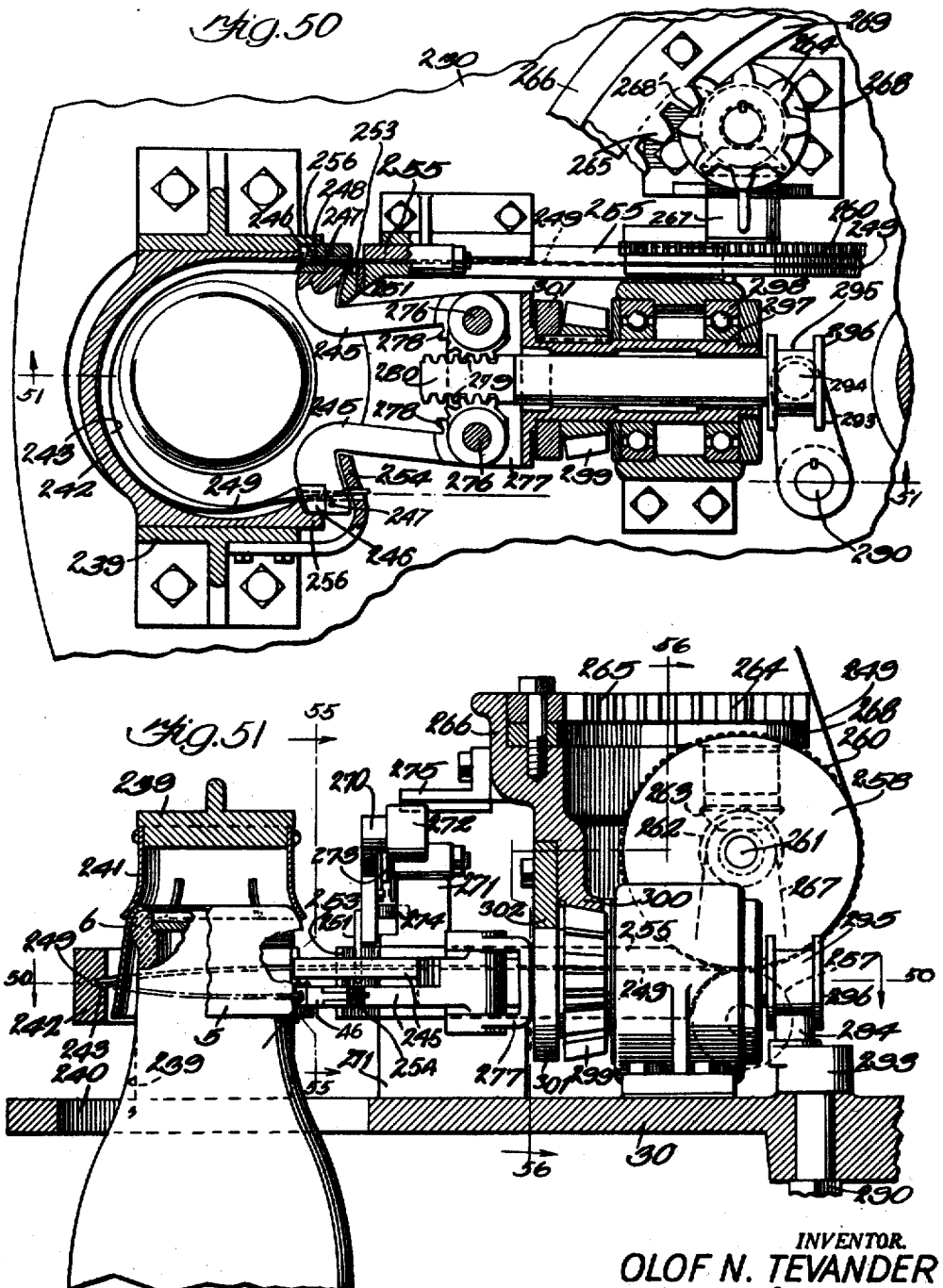

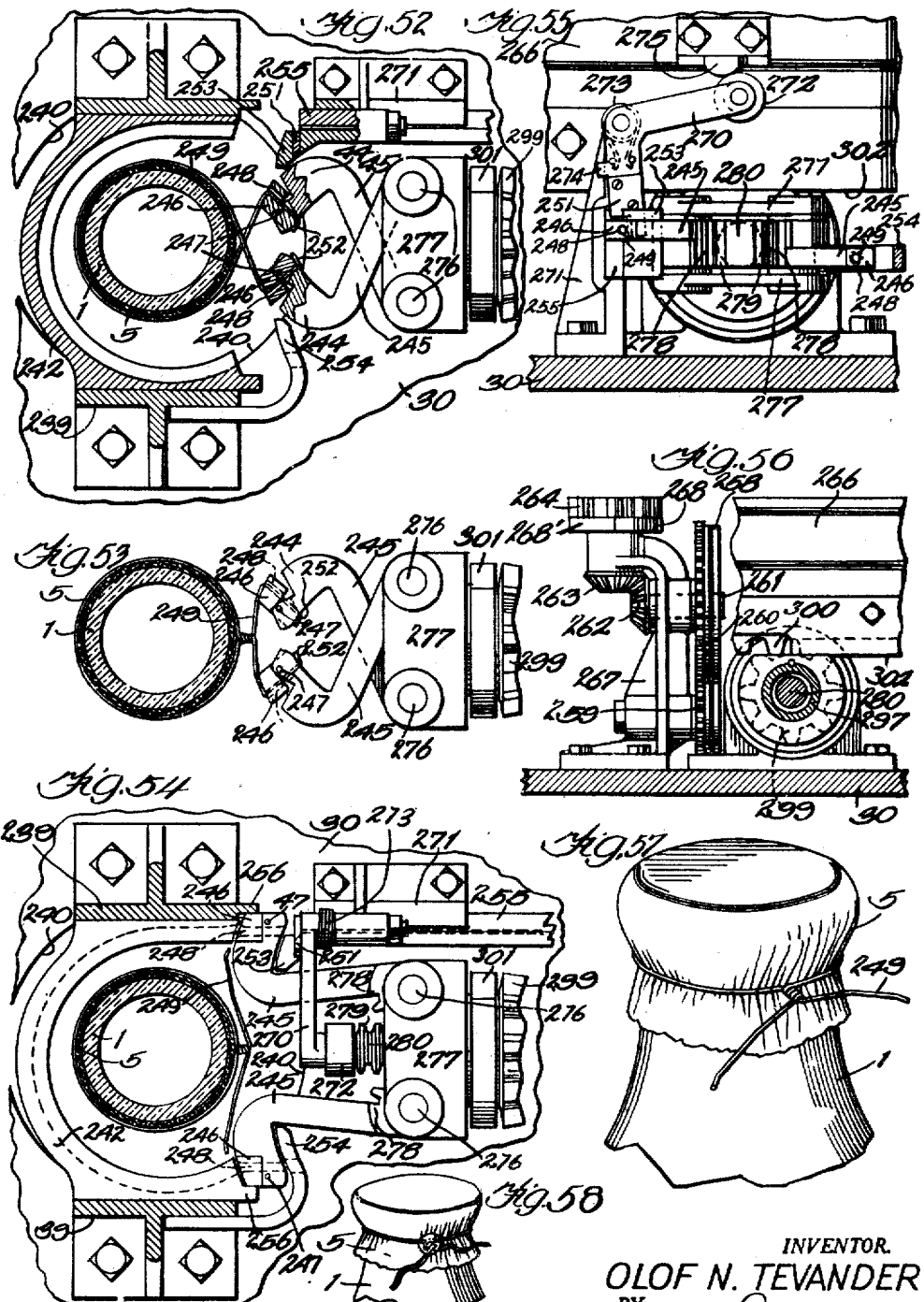

Patented Aug. 16, 1938

2,126,840

UNITED STATES PATENT OFFICE 2,126,840

BOTTLE CAPPING MACHINE

Olof N. Tevander, Chicago, Ill., assignor to Standard Cap and Seal Corporation, Chicago, Ill., a corporation of Virginia Continuation of application Serial No. 683,649, August 4, 1933. This application September 13, 1937, Serial No. 163,699

3 Claims. (Cl. 140—94)

This is a continuation of my application Serial No. 683,649, filed August 4, 1933.

My invention relates to machines for applying wire or metal bands to closures of containers and finds a very useful embodiment in machines constructed to apply wire to skirted caps on the beaded mouths of milk bottles, though the invention is not to be limited to this particular utility but may find other uses where flat or round wire is worked into a binding on an object.

In my prior Patent 1,431,341, dated October 10, 1922, a machine is disclosed for wrapping string about the skirts of closure caps, such machine including mechanism whereby clips are passed about the lapping ends of the string to fasten these ends together while the string is taut to maintain the assembly of the caps and the receptacles to whose mouth portions the caps are applied. In my present invention these clips are eliminated.

The machine of my invention as distinguished from the certain embodiment shown and claimed in my Patent 1,782,553, which shows means for supplying sealing wax or other cementitious material, and is not to be limited to this use in connection with any particular means or construction whereby the skirts may be held in contracted relation about the necks of bottles by means of cementitious material, includes the use, in the present case, of the wire which constitutes a sealing band and particularly includes means for joining integral end portions of the metal or wire band to hold the cap in place.

Thus, the machine of my present invention is preferably inclusive of mechanism whereby a suitable cement is applied to end portions of the wire or binder that is placed about the skirt of the closure cap from a source of supply which is provided in connection with the machine. The invention was stated in my original applications Serial No. 123,938 (now Patent No. 1,782,553) and Serial No. 497,918, of which this is a continuation in part as not being limited to the cementing of string portions together nor to the cementing of string portions to the cap skirt, as the invention contemplates the use of other cementitious material in any manner which is suited to the nature of the closure that is being secured to the bottle or container, or for any other purpose. However, the string in this embodiment of the invention, is preferably metallic wire and round, though strands of other material and shape may be used. The cement employed is desirably a metal sealing cement such as solder which is applied upon the wire after, or before, the string has been passed around the skirt of a bottle cap.

In carrying out my invention I employ a plurality of positioners for bottles having a skirted closure cap, the mechanism constructed to contract the cap skirt about the neck of the bottle, and mechanism for sealing the cap skirt in contracted condition on the bottle, said positioner and mechanisms being relatively movable into cooperative relation, the mechanism arranged so that the band material will not be withdrawn from the source of supply nor the sealing effected unless a bottle is present on the particular positioner in question.

This present application is also a continuation in part insofar as the claims and subject matter hereof are also common to my original application Serial No. 123,938, of my original then pending application Serial No. 123,937 (now Patent No. 1,635,515), both said applications having been filed July 21, 1926. This present application is also a continuation in part of my present co-pending application Serial No. 497,918, as stated supra, and is inclusive of mechanism whereby cement is applied to the ends of a strand of string that is placed about the skirt of the closure cap. Cement is employed which will flux in response to a fluxing agency and which will harden, after being fluxed, to maintain the string in closure contracting relation. The strand of string employed is preferably circular in cross-section, and is preferably provided with the cement before it is employed in the machine. The cement employed is preferably solder in which case the string is desirably metallic. If solder is employed as a cement, the fluxing agency is heat.

I prefer in this present case to employ metallic wire for the sake of simplicity in the manner of its treatment but the invention is not to be thus limited as to some of the claims, nor is it to be limited to the use of strands that are circular in cross section.

The general features of one form of this invention will be more fully explained in connection with the accompanying drawings, Figures 1 to 26, in which Fig. 1 is an elevation of the preferred form of machine, parts being shown in section;

Fig. 2 is a view of a part of the mechanism shown in Fig. 1 in the direction of arrow 2;

Fig. 3 is a view on line 3—3 of Fig. 1;

Fig. 4 is a view on line 4—4 of Fig. 1;

Fig. 5 is a view on line 5—5 of Fig. 1;

Fig. 6 is a view on line 6—6 of Fig. 1;

Figure 11:
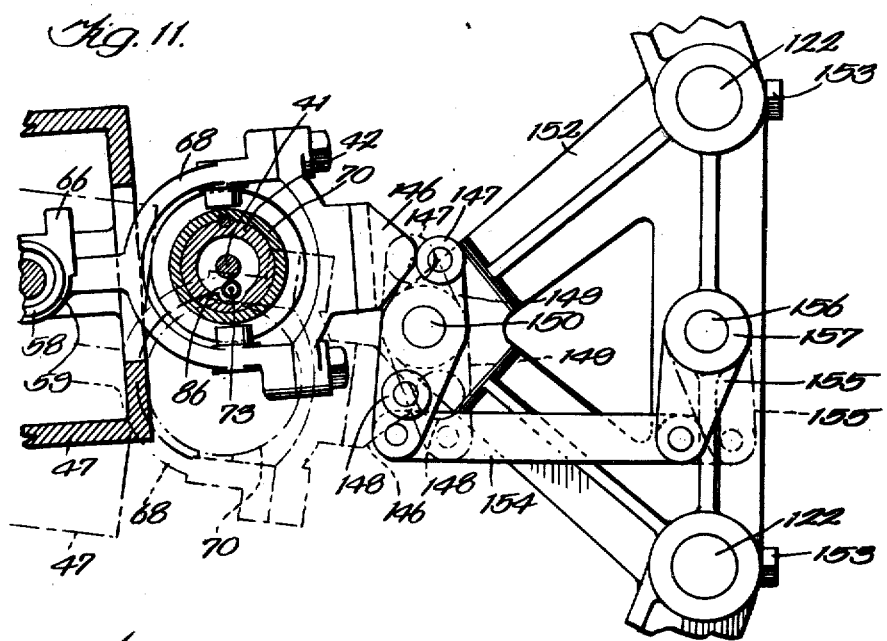
Figure 12:
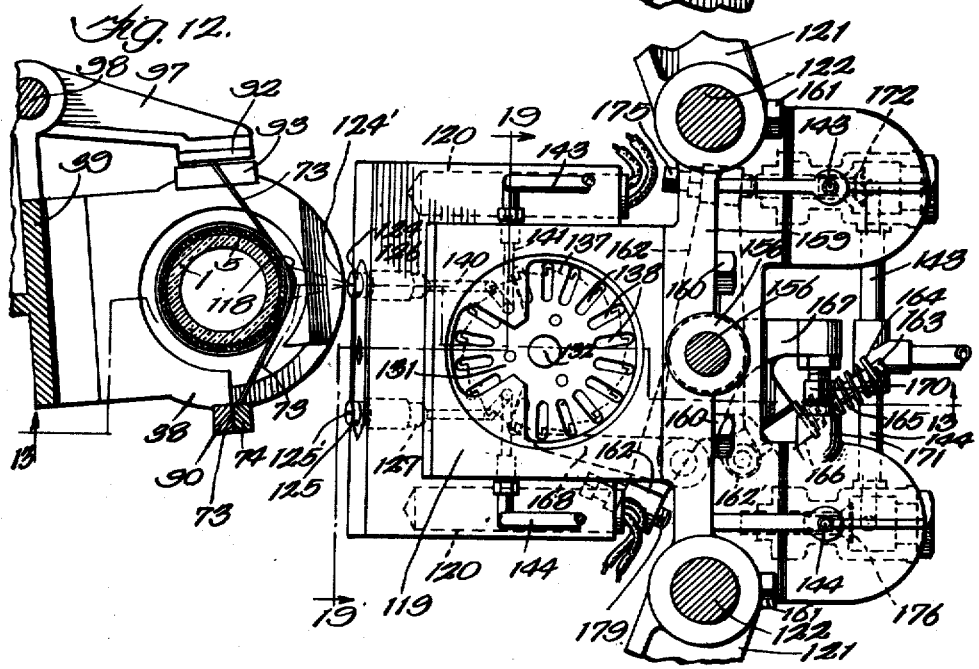
Figure 32:
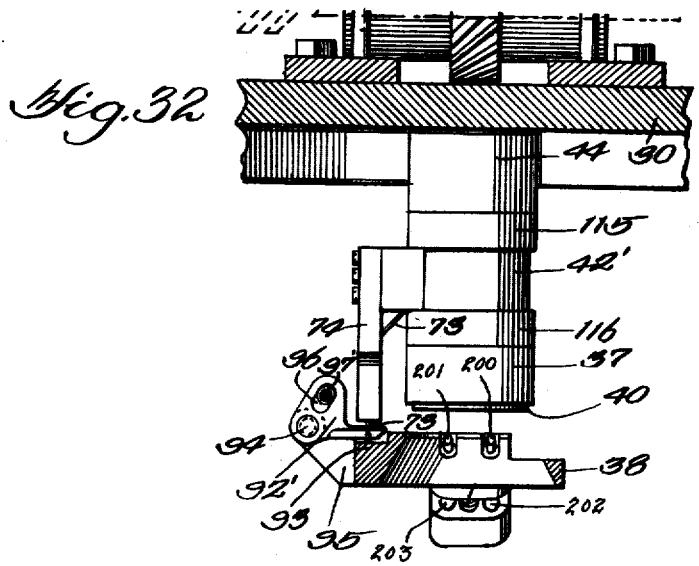
Figure 31:
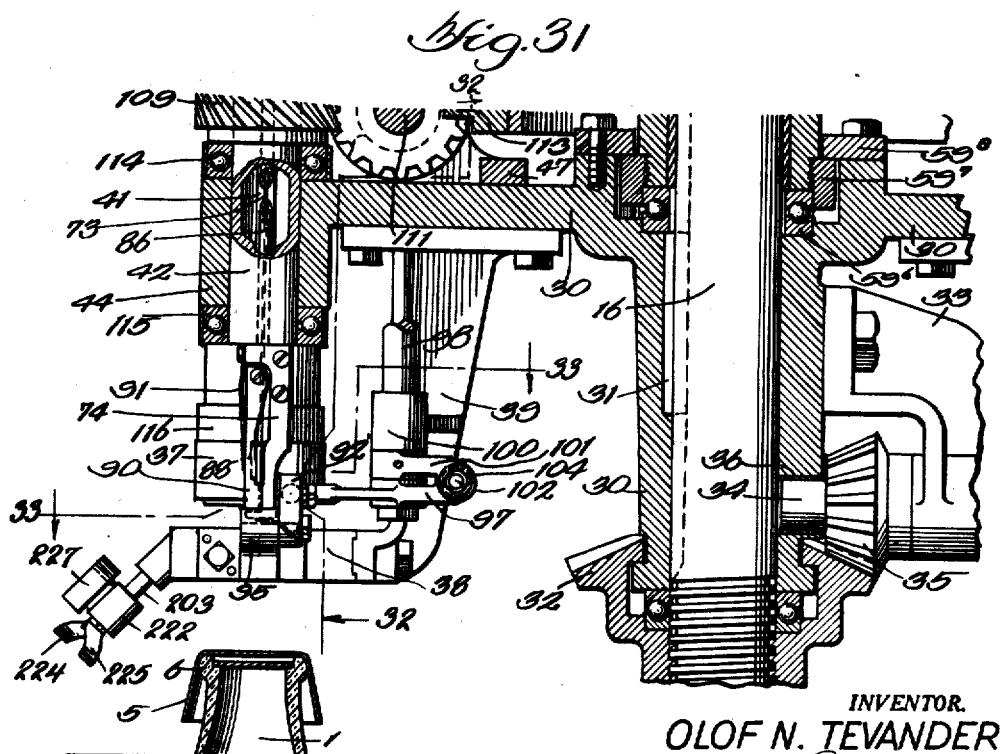

Fig. 7 and Fig. 7a taken together, illustrate a view in elevation with parts shown in section and parts in full elevation, the bottom of Fig. 7 matching with the top of Fig. 7a;

Fig. 8 is a sectional view on line 8—8 of Fig. 7;
Fig. 9 is a sectional view on line 9—9 of Fig. 7;
Fig. 10 is a sectional view on line 10—10 of Fig. 7;
Fig. 11 is a sectional view on line 11—11 of Fig. 1 with parts in changed positions;
Fig. 12 is a view on line 12—12 of Fig. 1 with parts in changed positions;
Fig. 13 is a view on line 13—13 of Fig. 12;
Fig. 14 is a view on line 14—14 of Fig. 13, with parts omitted and some parts shown in full;
Fig. 15 is a view looking in the direction of arrow 15, Fig. 13;
Fig. 16 is an enlargement of a part of Fig. 13;
Fig. 17 is a sectional view on line 17—17 of Fig. 16;
Fig. 18 is a view similar to Fig. 12 with parts omitted, broken away and in changed positions;
Fig. 19 is a view on line 19—19 of Fig. 12;
Fig. 20 is a sectional view on line 20—20 of Fig. 18;
Fig. 21 is a view in elevation in the direction of arrow 21, Fig. 6;
Fig. 22 is a sectional view on line 22—22 of Fig. 21;
Fig. 23 is a sectional view on line 23—23 of Fig. 21;
Fig. 24 is a view in elevation of the upper portion of the bottle illustrating a cap applied to a bottle mouth by a string fastened by the machine of my invention;
Fig. 25 is a sectional view on line 25—25 of Fig. 24;
Fig. 26 is a fragmentary elevation, partly in section, of an embodiment of my invention showing the fastening of a metallic strand by means such as solder;
Fig. 27 is a view on line 27—27 of Fig. 26;
Fig. 28 is a view on line 28—28 of Fig. 26;
Fig. 29 is a view on line 29—29 of Fig. 26;
Fig. 30 is a view in elevation of a part of the mechanism which is shown in Fig. 29;
Fig. 31 illustrates a view in elevation with parts shown in section;
Fig. 32 is a sectional view on line 32—32 of Fig. 31;
Fig. 33 is a sectional view on line 33—33 of Fig. 31 the bottle and the cap skirt being shown in section for clearness in illustration;
Fig. 34 is a view on the line 34—34 of Fig. 35;
Fig. 35 is a view on the line 35—35 of Fig. 29 with parts omitted;
Fig. 36 is a view on line 36—36 of Fig. 33;
Fig. 37 is a view of a part of the mechanism looking in a direction of arrow 37 of Fig. 34;
Fig. 38 is a sectional view of a part of the bottle illustrating the union between the lapping ends of the string;
Fig. 39 is a sectional view on line 39—39 of Fig. 30;
Fig. 40 is a sectional view on line 40—40 of Fig. 30 and looking in the direction of arrow 40 in Fig. 39;
Fig. 41 is a view similar to Fig. 40 showing parts in changed positions;
Fig. 42 is a sectional view on lines 42—42 of Fig. 33 with parts in changed positions;
Fig. 43 is a view in elevation of the upper portion of a bottle with a closure cap as applied thereto by the machine;
Fig. 44 is a view partly in section of an embodiment of my invention showing a milk bottle capping machine in which the string or wire is fastened by twisting;

Fig. 45 is a sectional view on the line 45—45 of Fig. 44;
Fig. 46 is a view generally taken on line 46—46 of Fig. 44 but also somewhat diagrammatic;
Fig. 47 is a sectional view on line 47—47 of Fig. 45 but showing additional mechanism not appearing in Fig. 45 and with some of the parts omitted;
Fig. 48 is a sectional view on line 48—48 of Fig. 47 the sequence of operations being noted upon this figure;
Fig. 49 is a perspective view illustrating one of the two grippers which are similarly formed with a portion of the arm carrying this gripper;
Fig. 50 is a sectional view on line 50—50 of Fig. 51;
Fig. 51 is a sectional view on lines 51—51 shown in both Figs. 48 and 50;
Fig. 52 is a view showing a portion of the mechanism that appears in Fig. 50 with parts in changed positions but before the completion of the wire twisting operation;
Fig. 53 is a view showing some of the parts appearing in Fig. 52 after the twisting operation has been completed;
Fig. 54 is a view showing the mechanism portion illustrated in Fig. 52 and additional parts, this figure illustrating the grippers in their initial positions preparatory to the twisting operation;
Fig. 55 is a view on line 55—55 of Fig. 51;
Fig. 56 is a view on line 56—56 of Fig. 51;
Fig. 57 is a perspective view illustrating a cap fastener held in place by a metallic wire ring formed of a looped strand of wire whose ends are twisted by the operation of the machine;
Fig. 58 illustrates the application of the skirt of a bottle cap to a bottle neck by means of a nonmetallic string operated upon by the machine and whose twisted ends are maintained together by means of a bead of sealing wax or other cementitious material.

*Driving mechanism*

The bottles 1 are suitably supplied to a stationary deck 2 carried upon posts 3 which are supported by the base 4 of the machine. These bottles have caps 5 initially loosely applied thereto. The skirts of these caps are to be tightened about the bottle necks by the machine of my invention so as to underlie the beads 6 (Fig. 25) about the bottle mouths. The bottles, with the loose caps thereon, are fed through the chute 7 in position to be engaged by the teeth of the star wheel 8 which serve to continue the travel of the bottles as they leave the chute and to direct the same individually onto the vertically adjustable sections 9 of a disc-like table 10, these table sections being the preferred form of bottle positioners.

Any suitable mechanism may be employed for operating the various operating elements that are located above the deck 2. In the embodiment of the invention illustrated, an electric motor 11 may be employed for operating a main drive shaft 12. Power is transmitted to this drive shaft at adjustable speed through the intermediation of any suitable speed changing gearing 13. The shaft 12 has a worm 14 thereon which is in mesh with a worm wheel 15. The worm wheel is fixed upon a shaft 16 on which there are also fixed the spur gear 17 and the table 10. The shaft 16 is journalled at its upper end in a sleeve bearing 16' carried by the spider 16² which is mounted upon the upper ends of the rods 16³ that are secured at their lower ends upon the base 4. This spur gear is in mesh with another spur gear 18 that is fixed upon a shaft 19 upon which shaft is also fixed the star wheel 8.

The bottle supporting table 10 is constantly turned and while turning, the sections 9 thereof are gradually elevated from the plane, proper, of the table and gradually restored to this plane, the final capping operation that is to be described occurring when said table sections are in their upper limits of their movements.

I provide a stationary cam track 20 upon which cam rollers 21 travel, to rise and fall. Each table section 9 is assembled with a cam roller so as to rise and fall therewith. As illustrated, each table section 9 is carried at the upper end of a spring barrel 22. A piston 23 is within the lower end of the spring barrel and is normally held in fixed relation therewith by means of a spring 24 which abuts at its lower end upon the piston and at its upper end against the top end wall of the spring barrel. A link 25 connects each piston 23 with one end of a bell crank 26 upon whose elbow the corresponding cam roller is journaled. The other end of this bell crank is pivoted upon arm 27 depending from a bearing support 28 which is fixed upon the shaft 16 and is located below the table 10.

As the shaft 16 turns, the cam rollers move bodily therewith over the cam track 20 to elevate and lower the table sections 9 to enable these table sections to function. As the shaft 16 and the parts thereon turn, the spring barrels 22 rise and fall due to the normally fixed relation of the piston 23 therewith. These spring barrels are guided in their movement by bearings 29 in the bearing support 28. If, in the final capping operation, the bottles should encounter undue strain, the springs 24 will yield to prevent the bottles from breaking, the pistons 23 then rising in the spring barrels.

A support 30 is in normally fixed relation with the shaft 16. This support has splined connection with the shaft 16 as indicated at 31 whereby it may be permitted movement lengthwise of the shaft. A bevel gear 32 has a nut formation 32' screwed upon the shaft 16 and has tongue and groove connection with the support 30 so that this support may be elevated and lowered along the shaft. A bracket 33 is carried by the support 30 and carries one bearing for the shaft 34 of the bevel pinion 35, the other bearing 36 for this shaft being provided in the support 30. The outer end of the shaft 34 is squared, Fig. 1, so that the bevel pinion 35 may be turned by hand to turn the bevel gear 32 that meshes therewith to turn nut 32' to elevate or lower the support 30. By this means, the chucks 37 which are carried by the support 30 through the intermediation of mechanism to be described, and which are provided to receive the tops of the bottles, may be elevated or lowered to suit the heights of the bottles being operated upon by the machine. Each table section 9 has a chuck 37 individual thereto and in vertical alignment therewith, each such table section and the chuck corresponding thereto cooperating to hold a bottle therebetween. A tapering guide 38 is interposed between each table section 9 and the chuck 37 individual to this table section, the guides being carried by brackets 39 that are carried by the support 30. The guides 38 serve to direct the upper ends of the bottles into the chucks 37 and also to gather the skirts of the caps about the bottle necks preparatory to the application of the tightening rings or bands about such cap skirts, in case these skirts flare too much.

Each cycle of operations occupies one revolution of the shaft 16 and support 30 and commences with the deposit of a bottle upon the table section 9 that is to receive it. After the bottle has been received upon the table section 9 that is to carry it, the table 10 and the table sections 9 turn a few degrees before the particular table section 9, in question, commences to rise to permit of some preparatory mechanical automatically effected adjustments. The bottle, in being raised, has its mouth end brought snugly into the chuck 37 overlying the table section 9 that carries such bottle. The bottle raises a solid plunger 40 which extends into the chuck 37. Each plunger has a stem 41 which is mounted to slide in a sleeve 42 which rotates in vertically aligned bearings 43 and 44. Each bearing 43 is held in place by a set nut 45 which passes through a sleeve 46. This sleeve 46 is an integral part of a bracket 47 which is bolted upon the top side of the support 30. When a plunger 40 is raised by the bottle beneath it, the upper end of the plunger stem 41 lifts the floating disc 48 that is coaxial with the plunger and the plunger stem. The disc 48 carries three upright pins 49 that slide within guiding holes formed in the inturned upper end of the extension 50 of sleeve 42. The upper ends of said pins thereupon lift the collar 51 which is loose upon the shaft 52 which is coaxial with and fixed with respect to the sleeve 42, this shaft being directly fixed upon the upper end of the sleeve extension 50. The groove of the collar 51 receives pins 53 provided upon the yoke lever 54 which is intermediately pivoted upon the shaft 55 that is journaled at the top end of the bracket 47. There is such a lever 54 at each bottle position, each lever constituting a part of a string or wire winding mechanism, there being as many such winding mechanisms as there are bottle positions. The base end of each yoke lever 54 carries an abutment 56 which is pressed upon by an upwardly spring pressed upright pin plunger 57. The spring 58 which presses upwardly upon the pin 57 is bottomed at its lower end upon the sleeve 59 which is slidable upon the pin 57 and presses at its upper end, upon the yoke 60 which is secured to the pin 57 and to the upright rod 61 which is slidable within bearing sleeves 62 and 63 carried by the bracket 47. When the plunger stem 41 is raised, the lever yoke 54 is turned clockwise to depress the pin 57 against the force of the spring 58. When thus depressed, the rod 61 is depressed. The adjustable nut 64 upon the rod 61 thereupon presses, at its lower end, upon one end of the bell crank 65 which is pivoted at its elbow upon the bracket 47. The other end of the bell crank is thereupon withdrawn from engagement with the detaining lug 66 which is provided upon the upper end of the sleeve 59. The bell crank 65, which thus functions as a detent normally to hold the sleeve 59 in its upper position, is withdrawn from its detaining position by the downward movement of the rod 61 to permit the spring 58 to depress the sleeve 59. This adjustment of the bell crank lever is effected against the force of the restoring spring 67 which is anchored at one end of the bracket 47.

A yoke 68 is carried by the sleeve 59 and itself carries pins 69 that are received within an annular groove formed in the clutch collar 70 that is splined upon the sleeve 42. Clutch collar 70 is formed with clutching formations upon each end thereof which are respectively complemental to the clutching formations upon the stationary clutch member 71 (constituting an extension of the bearing 43) and the rotatable clutch member 72. When the clutch collar or member 70 is in clutching engagement with stationary clutch member 71, said clutch collar is held from rotation so that the sleeve 42 is not then rotatable. The engagement of the members 70 and 71 is effected during the movement of the table section 9 from the time this table section has received a bottle and until such table section is about to be raised by the cam track 20. To this end, the sleeve 59 carries a cam member 59' which rides upon the roller $59^2$ carried by the bracket $59^3$ which, in turn, is carried upon the normally stationary gear carrier $59^4$. This gear carrier is supported upon the non-rotating sleeve $59^5$ to which it is keyed, a thrust ball bearing structure $59^6$ intervening between the lower end of the sleeve and the support 30. A ring $59^7$ is screwed upon the lower end of the sleeve and a collar $59^8$ is secured upon the support 30 and overlies the ring to keep the sleeve $59^5$ from rising. This sleeve is held from rotating by means of a pin $59^9$ depending from the bearing 16' and which passes through and is in sliding relation with an arm $59^{10}$ provided upon the sleeve $59^5$. The members 70 and 72 are thus positively separated at the initiation of a cycle and are permitted to be engaged when the corresponding table section 9 rises providing there is a bottle upon this table section. If there is no bottle, the clutch member 70 will be held elevated by the detent lever 65 so that the cycle of operations, which is commenced by the interaction of the elements 59' and $59^2$, is not completed if the bottle is absent. When the clutch collar or member 70 is moved downwardly into clutching engagement with the clutch member 72, a result which occurs when a bottle lifts the corresponding plunger 40, said clutch collar is turned by said clutch member 72 to turn the sleeve 42. The clutch member 72 which is thus employed to drive the sleeve 42 is turned one and one-half times by the time the support 30 has turned a half of a revolution and is turned a half of a revolution during, approximately, the last one-sixth of the revolution of said support 30, all as will more fully hereinafter appear.

*Sealing element winding mechanism*

The sleeve 42 is provided for winding a strand of string or wire 73 to about the skirts of bottle caps. The string is directed upon the skirts by being passed through a nozzle 74 which is carried upon the portion 42' of sleeve 42. The discharge end of the nozzle is located sufficiently away from the axis of the plunger stem 42 as to enable the nozzle, in being revolved around the bottle cap, to suitably apply the strand 73 to the skirt thereof. Each chuck 37, which is individual to each table section 9, has a string winding mechanism individual thereto. Each string winding mechanism has a reel or spool 75 which is journaled upon the upright shaft 76 that is coaxial with the shaft 52, the shaft 76 being secured to the upper end of a yoke 77 whose lower end is secured to the shaft 52 whereby the two shafts turn together with the sleeve 42. A spring 78 abuts against a washer 79 which is positioned by a nut 80 screwed upon the upper end of the corresponding shaft 76. The lower end of said spring 78 presses down upon the disc 81 that bears against the upper side of the reel 75 to hold the lower side of the reel against the flange 82 of the yoke 77. The reel 75 is thus prevented from turning with respect to the shafts 76 and 52 any faster than it is so turned by the string 73 being withdrawn therefrom. The spring 78 also takes part in adjusting the tension upon the string being wound about the bottle cap, the adjustment of the spring determining the degree of tightness of the winding of the string about such cap. The string 73 is passed from the corresponding reel 75 over the idler pulleys 83, 84 carried by the bracket 85 which is in an integral part of the yoke 77. The string, after having left the idler pulley 84, is passed through the upright guiding tube 86 which is fixed with respect to the sleeve 42 and which passes through this sleeve and the shaft 52. Said tube is disposed alongside of the axis of rotation of said sleeve and is located between this axis and the nozzle 74. The string, after issuing from the lower end of the tube, passes over the idler pulley 87 which is journaled upon the sleeve 42. The string, after having passed through the pulley 87, passes over the guiding lug 88 carried by the nozzle 74, this lug directing the string through the nozzle outlet opening 89. The string, where it is about to enter the nozzle end 89, is pressed against a side of the nozzle by the block 90 which, in turn, is pressed upon by the leaf spring 91.

By mechanism to be presently described, the leading end portion of the string which has passed through the nozzle, is clamped between the members 92 and 93 which constitute an anchorage for this leading end of the string in order that the string may be held, at one end, during the rotation of the nozzle, about the corresponding bottle neck, the string thus remaining clamped while the nozzle turns one and one-half times about the bottle neck. The nozzle and the clamp thus constitute strand holders. The clamping action effected by the members 92, 93 is accomplished at the initiation of a cycle of operations and during the time that the members 59', $59^2$ interact to separate the clutch members 70 and 72. The clamping member 93 is stationary, being desirably part of the stationary tapering guide 38. The clamping member 92 is upon one end of a lever 97 which is intermediately journaled upon a shaft 98 that is itself journaled in bearings 99, 100 carried by the brackets 47 and 39 respectively. An arm 101 is fixed upon the shaft 98. The stem of a bolt 102 passes through the lever 97 and the arm 101 and is surrounded by a spring 103. This spring has one end in engagement with a washer 104 which is adjustable in position by a nut screwed upon the stem of the bolt. The other end of the spring engages the arm 101 and presses the head of the bolt against the lever 97. The spring, when permitted to function, operates through the bolt, lever and arm to apply the clamping member 92 to the string. One end of a lever arm 105 is secured to the top end of the shaft 98 and carries a cam roller 106 at its other end. This cam roller enters a cam slot 107 formed in a normally stationary cam 108 which is carried by the upper end of the non-rotating sleeve $59^5$. This cam slot is so shaped that the clamping member 92 will be applied just as soon as the cycle of operations is initiated and will remain applied until after the overlapping string ends are waxed or cemented together and the cement or wax is hardened. The string is severed, at the nozzle, just before the clamping member 92 is released, which release occurs upon the arrival of the cam roller 106 at a suitably shaped portion of the cam slot 107 as indicated in Fig. 4. When the nozzle has been turned once and a half times about the bottle neck, the cementing or waxing device is brought into operation, as will later appear.

The gearing for turning the clutch member 72 which turns the sleeve 42 through the intermediation of the clutch members 70 and 72, as hitherto described, is inclusive of a spiral gear 109 fixed upon and coaxial with the clutch member 72, a spiral gear 110 meshing with the gear 109 and fixed upon a shaft 111 which is journaled at its ends in the bracket 47 that bodily rotates with the support 30 carrying it, and the stationary segmental spiral rack 112 which is coaxial with the shaft 16 and which is carried by the normally stationary gear carrier 59⁴. A space intervenes between the entering end of the rack 112 and the gear 110 at the commencement of the cycle of operations so that there will be no rotation of the nozzle 74 while the bottle is being elevated. The gear 110 is positively held from rotation until it enters into mesh with the rack 112 by means of the stationary feather 113 which passes through a radial slot in said gear. Previously to the meshing of the gear 110 with the rack 112, the clutch members 70 and 72 were engaged by the action of the elevated bottle. If there happens to be no bottle in place upon a particular table section 9, the clutch members 70 and 72 will not be coupled so that there will be no rotation at all of the nozzle during the travel of said table section 9 owing to the separation of said clutch members. A thrust ball bearing structure 114 is interposed between the clutch member 72 and the support 30, another thrust ball bearing structure 115 is interposed between the support 30 and the enlargement 42' of the sleeve 42, and a third thrust ball bearing structure 116 is interposed between the sleeve enlargement 42' and the top of the chuck 37. The ball bearing structure 116 prevents the rotating sleeve 42 from turning the chuck 37, the rotation of the bottle by said sleeve 42 thus being prevented. It is understood that the cycle of operations commences at the left hand side of the constantly rotating support 30. The nozzle revolving operation ceases when said support 30 has about completed one-half of a revolution, that is, when the gear 110 leaves the stationary rack 112 whereupon said gear receives another stationary feather 117 to guard against incidental rotation of said gear.

Cement applying mechanism

I will first describe the mechanism that is employed to direct the flow of metal cement upon the wire after it has been applied to a bottle cap and the means by which the wire cement is prepared for its application to the wire. The metal cementing substance is received in a pot 119 which is heated by electrical resistance units 120 in close proximity to the pot, as illustrated most clearly in Figs. 12 and 19. The pot is carried by the yoke 121, being positioned upon this yoke by the upright rods 122 on the yoke that pass through eyes 123 formed upon the pot. The yoke 121 is carried by the clamps 121' which are clamped upon two of the rods 16³ in order that the height of the pot may be suited to the level of the bottles being operated upon. The pot carries two nozzles 124 and 125 which are positioned to direct the heated sealing cement upon the wire 73 where this wire crosses, the nozzle 124 supplying a portion of the total sealing cement that is to be applied to the wire and the nozzle 125 supplying the remainder of the sealing cement that is to be applied to the wire, the preferred form of product being illustrated in Figs. 24 and 25. The nozzles are in the form of sleeves having inturned discharge ends where the nozzle orifices 124', 125' are provided. These sleeves enclose plugs 126, 127 which have spiral passages in their outer surfaces as indicated most clearly at 128 in Figs. 13, 14, 16 and 17. A space intervenes between the front or delivery end of each spiral passage and the corresponding discharge orifice. The melted sealing cement whirls in this space in a somewhat solid mass instead of sprayed form so that it will issue through the nozzle orifice in a somewhat solid stream, instead of in a spray. The flow of the melted or fluid cement through the orifices is promoted and directed by the truncated conical or tapering portions upon the front ends of the plugs, one of these conical portions 129 being shown in full lines in Figs. 13, 14, 16 and 17 and the other conical portion 130 being shown in dotted lines in Fig. 14. The nozzle orifices 124', 125' are of narrow elongated form and the nozzle sleeves 124, 125 are mounted in such relatively adjusted positions, in view of the distance the cement must travel between the nozzles and a bottle and in view of the tendency of the cement to whirl or rotate during such travel, that the cement will be applied to the wire in the form of an oval whose major axis is in the plane of the wire, this result being furthered by the cooperation of the truncated conical portions 129 and 130 as they are related to the nozzle orifices. The cement pot 119 has a revolving bottom 131 coaxial with the pot. This bottom is fixed upon and turns with an upright shaft 132 which is journaled upon bearings 133 carried by the bracket 134 which, in turn, is carried by the yoke 121. The shaft 132 carries a collar 135 which is pressed upwardly by a spring 136 which surrounds the shaft, the lower end of this spring being bottomed upon the lower one of the two bearings 133. The spring thus serves automatically to compensate for any wear upon the top of the bottom of the pot. The bracket 134 and yoke 121 have tongue and groove engagement whereby the tension of the spring may be adjusted. A ratchet wheel 137 is fixed upon and is coaxial with the pot bottom 131. The upper surface of the pot bottom is formed with radial grooves in the form of pockets 138, there being as many such pockets 138 as there are teeth upon the ratchet wheel 137. These pockets are normally uncovered so as to receive cement from the pot. Two of the pockets are, at a time, covered by the closures 139 formed upon the interior of the pot and, when any two pockets are thus covered, they communicate at their outer ends with the outlets 140 in the pot, which outlets are in communication with the spiral grooves 128 in the aforesaid plugs 127. The inner ends of the pockets that are covered by the closures 139 are in communication with the air passages 141 and 142 to which air is supplied under pressure from the pipes 143 and 144 that convey air from the pressure tank 145.

By mechanism which will be presently described, the air is first directed through the pipe 143 and the nozzle 124 to furnish a part of the cement for the overlying wire whereafter the air is directed through the pipe 144 and is cut off from the pipe 143, the air passing through pipe 144 directing the remainder of the cement that is to be applied upon the wire. After the two pockets that are covered by the closures 139 are thus emptied, the ratchet wheel 137 is turned another step, in the next cycle of operations, to replace the two filled pockets in their association with the nozzles and the air pipes.

The preferred form of mechanism for operating the ratchet wheel and for regulating the flow of air through the pipes 143, 144 will now be described. This mechanism includes a master cam 146 which serves to operate the mechanism, this master cam being provided upon the yoke 68, vertically movable in the manner hitherto described, whereby it is lowered to an operative position if there is a corresponding bottle in place and is held raised from this operative position if there is no corresponding bottle in place so that, in the latter event, no cement will be blown during the complete revolution of the support 30 that occurs during the operation cycle pertaining to such revolution which is rendered incomplete due to the absence of the bottle. When the yoke 68 has been lowered as a consequence of the presence of a bottle on the table section 9 beneath it, the master cam 146 is lowered into the zone of the cam rollers 147 and 148 upon the lever 149 which is secured between its ends to the pin 150 that is journaled in bearings 151 carried by the bracket 152. This bracket is secured upon the rods 122 by the set bolts 153 and is also secured upon two of the rods 16³ by means of clamps which are similar to clamps 121'. As will hereinafter appear, when the master cam 146 engages the cam rollers 147, it turns the lever 149 clockwise to turn the ratchet wheel 137 a tooth space and to admit cement ejecting air to the pipe 143. When the master cam 146 operates upon the cam roller 148, the lever 149 is turned counterclockwise to admit cement ejecting air to the pipe 144, the ratchet wheel 137 then being held stationary by the action of the spring 136.

The end of the lever 149 which is adjacent the cam roller 148 is connected by means of a link 154 with one end of the lever arm 155 whose other end is secured to the shaft 156 which is journaled in the bearing 157 formed upon bracket 152 and the bearing 158 upon the support 159 which also carries the cement pot 119, this pot being bolted to the support by the bolts 160. The support 159 is also secured to the rods 122 by means of the set bolts 161. Another lever arm 162 is also fixed upon the shaft 156. As the gear 110 is about leaving the rack 112, the cam 146 is brought into engagement with the roller 147 to place the parts in the position shown by full lines in Fig. 11 and as illustrated in Fig. 12. When the parts are being placed in this position, the lever 162 is turned in a clockwise direction whereby the rod 163, which is pivotally connected to an extension 162' of the lever 162, is pulled upon to draw the flange 164 upon said rod 163 against one end of the spring 165 whose other end is bottomed upon the arm 166 that is integrally formed with a bell crank lever 167 which is journaled at its elbow upon the shaft 156. The lever 167 is thus moved, through the intermediation of the spring 165, in a clockwise direction, whereby the actuating pawl 168 operates upon the ratchet wheel 137 to move this wheel a tooth space whereby the cement receiving pockets 138 that were emptied upon the previous cycle of operations are moved from their connections with nozzles 124, 125, and the pipes 143 and 144 and whereby the successive pockets, which are filled with hot metallic cement, are placed in connection with said nozzles and pipes in substitution for the emptied pockets. The pawl is held in engagement with the ratchet wheel by the spring 169 which is connected at one end with the pawl and at the other end with the lever 167. The bell crank lever 167 should be limited to a normally fixed range of arcuate movement in order that the ratchet wheel may be turned exactly one tooth space each time it is operated by the pawl so that the cement holding pockets that are newly brought into connection with the nozzles and the pipes are accurately positioned.

To this end, the lever 167 is provided with an abutment post 170 which engages the fixed abutment 171 upon the support 159. The post 170 is desirably in the form of a bolt in order that it may be adjusted. After the ratchet wheel 137 has thus been turned to a new position, the lever 162 continues its clockwise movement, being permitted so to do by means of the spring 165 which thus constitutes a yielding coupling between the levers 162 and 167. Following the positioning of the ratchet wheel to its new position for the purpose stated, a valve 172 is opened, this valve being included in the pipe 143 that supplies cement ejecting air under pressure from the tank 145 to the cement holding pocket that is in communication with the nozzle 124. This valve is inclusive of a spring 173 which constrains the valve to a closed position and the stem 174 which is engageable by a post 175 carried by the outer end of the lever arm 162. As hitherto stated, the valve is opened after the ratchet wheel has been moved to its new position, the engagement of the post 175 with the valve stem 174 occurring after this turning movement of said wheel. During the initial portion of the engagement of the gear 110, employed in the cycle under description, with the feather 117, the cement supplied to the wire where lapped or crossed upon the cap skirt is allowed to cool. A little later and still during the engagement of said gear 110 with said feather 117, the valve 176, which is included in the pipe 144, is opened to permit air under pressure to pass through this pipe to eject cement through the nozzle 125 upon the patch of cement previously applied to the wire through the nozzle 124. The lever 162 is moved counter-clockwise to release the valve 172 and open the valve 176 by the cam 146 when this cam reaches and operatively engages the cam roller 148.

The mechanism of valve 176 is similar to the mechanism of valve 172, there being a spring 177 which constrains the valve 176 to a closed position, the valve 176 having a stem 178 which is engageable by a post 179 upon the lever 162 when this lever is moved counter clockwise as stated. The posts 175 and 179 are adjustable in order to secure proper timing in the operation of the valves. The master cam 146 escapes the cam roller 148 while the gear 110 employed in the cycle being described is still in engagement with the feather 117, the spring 177 then being permitted to close the valve 176. While the aforesaid gear 110 is still in engagement with the feather 117, the second portion of cement that was applied to the wire has time to cool. The cap skirt desirably has nothing upon it except the wire that surrounds it and the cement which is allowed to spread upon the cap skirt so that the cement not only serves to cement the lapping or crossing portions of the wire together but also to secure the wire to the cap so that the wire may not be shifted with respect to the cap without detection. I do not wish to be limited to the cementing of lapping portions of the wire to each other since it is obvious that the wire may be cemented to the cap skirt without having lapping or crossing portions of the wire cemented to each other.

Strand severing mechanism

The mechanism for severing the wire is inclusive of a normally stationary knife 180 and a swinging knife 181, these two knives together constituting a pair of shears. Both knives are carried upon the post 182 which is provided upon the end of a lever 183 which is journaled upon a shaft 184 carried upon a bracket 185 which is carried by a yoke 186. This yoke is carried by clamps 187 that are clamped upon two of the bars 18³ whereby the shears may be adjusted vertically to suit the adjustment of the other parts that are made to suit the bottles being operated upon. The knife 181 is a part of a bell crank which is journaled at its elbow 188 upon the post 182. The end of the bell crank which is opposite the end where the knife 181 is formed moves between two stops 189 and 190 which are provided upon and within the hollow carrier 191 which is secured upon the yoke 186. When the support 30 turns sufficiently, the arm of the knife 181 between the stops 189, 190 is moved into contact with the stop 189 with the result that the knife 181 is rotated on its pivot 188 and thus caused to cooperate with the stationary knife 180 to sever the wire which is received between the two knives. When the wire has been severed, the aforesaid arm of knife 181 is moved into contact with stop 190, causing knife 181 to swing away from knife 180. The two knives are normally withdrawn from the path of the wire and are positioned to receive the wire between them when the wire is to be cut. To this end, the lever 183 which carries the knives is controlled by the spaced apart cams 192 and 193, these cams being provided upon the rotating support 30. The cam 192 first engages the cam extension 194 of the lever 183 to swing the knives into a position in which the wire will be between them whereupon the knives are brought together in the manner described and as illustrated in Figs. 22 and 23. When the wire has been cut, the knives are together moved to their outer position away from the wire, the lever 183 being suitably swung for this purpose by the cam 193 which engages the cam 195 fixedly upon the shaft 184 upon which the lever 183 is fixed.

Very shortly after the knives have been withdrawn, the gear 110 leaves the feather 117 whereupon this gear engages the arcuate segmental gear rack 196 which is carried by the gear carrier 59⁴ and is in the same plane with the rack 112. During this engagement of the gear 110 with the rack 196, the nozzle is turned a half revolution to bring the end of the wire projecting from the nozzle between the clamping members 92, 93, whereupon this wire end is clamped in the manner hitherto described, this clamping operation occurring upon the initiation of the next cycle. After the wire cutting operation and before this clamping of the wire is effected, the table section 9 carrying the bottle operated upon is lowered and the bottle is discharged from the machine, this discharge of the bottle being the conclusion of the cycle of operations under description. This bottle is discharged by one of the teeth of the star wheel 197 which star wheel is secured to the table 10. The tooth of the star wheel that engages this bottle forces the bottle to leave the table 10 and causes the bottle to enter the chute 198 that directs the bottle upon the deck 2 from which the bottle may be moved by an attendant.

Mechanism of the embodiment illustrated in Figures 26 through 43

Where the material used by the machine of my invention for forming a fastening around the skirts of the closure caps, is a binder of metal, that is wire already coated with a suitable metallic cement, certain principles of the machine described above are employed. The general details and arrangements of the bottle positioner, bottle "chucking" mechanism, the revolving table 10 and allied mechanism, the strand winding mechanism and other parts of this embodiment illustrated in Figs. 26 to 43, each inclusive, are similar to those shown in Figs. 1 to 10 inclusive and described above. A change however is required in the clamping member 92' as shown in Figs. 31 and 32 which is pivoted at 94 upon a bracket 95 that is carried by the guide 38. Said clamping member is formed with a slot 96 which receives the spherical end 97' of a lever 97 which is intermediately journalled upon a shaft 98 that is itself journalled in bearings 99, 100 carried by the brackets 47 and 39 respectively as shown in Fig. 9.

The operation of the clamping member 92' through the lever 97 is otherwise the same as already described with respect to the string, the operation of the clamp being effective during the rotation of the nozzle and until after the overlapping ring or wire portions are cemented together and the cement or solder hardened. The wire is severed at the wire nozzle just before the clamping member 92' is released. When the wire nozzle has been turned one and one-half times about the bottle neck the fluxing device is brought into operation as will later appear.

By mechanism which will be presently described, the lapping or crossing portions of the wire that has been passed about a bottle cap are soldered together, this soldering operation occurring during the initial portion of the engagement of the gear 110 with the feather 117, the cooling of the solder occurring during an ensuing portion of this engagement and the severing of the wire at the wire nozzle occurring during the concluding portion of such engagement as will hereinafter appear.

The cement employed is desirably one which will fuse in response to heat and is desirably in the nature of solder, as indicated at 118. The string is preferably metallic, particularly if the cement is in the nature of solder. The solder is desirably present upon and about the wire before the wire is employed in the machine. That is, the wire is so-called tinned wire and is supplied as such from the reels 75. The invention is not to be thus limited, however, nor is it to be limited to the soldering or cementing of lapping ring portions nor to the lapping of ring portions. By the winding mechanism which has been described, the wire is closely wrapped about the cap skirt about one and one-fifth times the circumference of the cap skirt so that there is provided a cap contracting ring having mutually lapping portions, Fig. 43, it being these mutually lapping portions that are soldered together by fluxing the solder that is on the wire and allowing the solder to cool to hold said lapping portions in ring contracting relation. The wire of the ring is continued beyond the soldered together mutually lapping portions of the ring so that the wire may be grasped, where unattached, to tear the mutually lapping portions of the ring apart when access is to be had to the bottle.

Where the cement is fluxed by heat and the heat is furnished by an electric current, I employ two contacts 200, 201 which project from metallic spring barrels 202, 203, these contacts being inwardly pressed toward the wire by springs 204 within said spring barrels. The spring barrels slide within insulating sleeves 205, 206 which are carried by and are in fixed relation to the guide 38, Fig. 34. The sleeves 205 and 206 are desirably so positioned that the contacts 200 and 201 are at the ends of the lapping portions of the wire ring that are to be soldered together. Current is passed through the circuit that includes the spring barrels 202, and 203 and the contacts 200 and 201 from the battery 207, mechanism being provided for withdrawing the contacts from engagement with the wire when the circuit has endured sufficiently long to melt the solder in order that the solder may be allowed to cool, these results occurring while the gear 110 still engages the feather 113. The mechanism for thus controlling the circuit is desirably inclusive of two arcuate contact bars 208 and 209 which are assembled by bolts 210 which pass through circular openings in bar 209 and the arcuate openings 211 in bar 208. These bars are suitably insulated from the bolts by means of the insulating sleeves 212 and the insulating washers 213, the sleeves 212 being shouldered to receive the bar 209, the reduced ends of these sleeves passing through the circular holes in this bar. The two bars may be relatively adjustable longitudinally of each other to regulate their aggregate length, the two bars being thus in effect a bar whose effected length is adjustable.

The mechanism for controlling the circuit is also inclusive of a single bar 214 (Figs. 34 and 37) which is mounted upon a yoke 215 by the aforesaid bolts 210. This yoke is carried by clamps 216 that are clamped to two of the rods 16³. By means of these clamps, the yoke 215 may be adjusted vertically to suit other adjustments that are made according to the size of the bottles being operated upon. The bars 208 and 209 are also carried by the yoke 215 through the intermediation of the insulating sleeves 212 which have other reduced ends that are received in circular holes in the bar 214. The bolts 210 after passing through the sleeves 212 pass through insulating washers 217, and are screwed into the cam extension 218 of the yoke 215. The bars are thus insulated from the yoke 215 and the bar 214 is likewise thus insulated from bars 208, 209, the latter two bars being in electrical connection. An additional bolt 219 may be employed for directly assembling the far end of the bar 214 with the yoke, this bar 219 being insulated from the yoke 215. The spring barrels 202, 203 are provided with shanks 220 of reduced diameter, these shanks being received in insulating sleeves 221 that are provided in the cross head 222. The spring barrels are clamped in assembly with the cross head by means of nuts 223 which are screwed upon the outer threaded ends of the shanks of spring barrels. Wipers 224 and 225 are clamped into electrical and mechanical assembly with the spring barrels by means of nuts 226 that are also screwed upon the threaded ends of the shanks of spring barrels. The wiper 224 has sliding contact with the arcuate contact bar 214. The wiper 225 has sliding contact with the arcuate contact bars 208, 209. A cam roller 227 is carried by the cross head 222 and is adapted to ride upon the cam 218. During the initial portion of the engagement of the gear 110 with the feather 117, the cam roller 227 is in engagement with the cam 218, to press the cross head inwardly to engage the contacts with the wire. Current from a battery opposed by the resistance of the wire and its solder causes sufficient heat to melt the solder which fluxes where the wire laps. The duration of the circuit is adjusted by relatively adjusting the two bars 208, 209, as will be apparent. When the contact wiper 225 leaves the contact bar 208, the circuit is opened. The contacts are also separated at this time, a result which is accomplished by means of the spring 228 that surrounds the post 229 which is screwed into the guide 38 and which has a head upon its outer end against which the spring thrusts the cross head when the cam roller 220 has left the cam 218.

After the circuit is opened, the gear 110 continues in engagement with the feather 117, the solder cooling after the circuit is opened. After the cooling of the solder has been completed which occurs near the termination of the engagement of the gear 110 and the feather 117, the wire is severed at the nozzle while still under tension between the wire nozzle and the clamp 92, 93.

The mechanism for severing the wire has already been described above in connection with Figures 1 to 25 and requires no further specific description. In like manner the movement of the wire nozzle for a half revolution to bring the end of the wire projecting from the wire nozzle between the clamping members 92, 93 occurs through the engagement of gear 110 with the rack 196 and thus prepared for a subsequent cycle of operation as has already been described.

*Sealing element applying mechanism*

In the modified form of my machine illustrated in Figs. 44–58 inclusive in which the strand ends are twisted together, the bottles 1 are supplied to the deck 2 and advanced by the star wheel 8 onto the disk-like table 10 as previously described. It will be understood that the bottle supporting table 10 is turned and the sections 9 thereof elevated and lowered during the cycle in which the capping operation is carried out.

A support 30 (Fig. 47) is in normally fixed relation with the shaft 16. This support has splined connection with the shaft 16 as indicated at 31 whereby it may be permitted movement lengthwise of the shaft. A large split nut 232 is screwed upon the upper end of the shaft 16 and has tongue and groove connection with the support 30 so that this support may be elevated and lowered along the shaft. A hand wheel 233 is provided upon the nut 232 to facilitate the turning thereof. The support 30 carries the balance of the mechanism that is complemental to the table sections 9 and the mechanism for fastening the caps upon the bottles. The support 30 is circular and concentric with the shaft 16. The periphery of this support is closely received between rollers 234 that project laterally from the sleeves 235, whereby these sleeves are assembled with and are carried by said support. These sleeves are adapted to slide upon the upright guide rods 236. These guide rods carry the spider 237 at their upper ends, this spider carrying the sleeve bearing 238 for the upper end of the shaft 16.

Yokes 239 are bolted to the upper side of the support 30, each table section 9 having a yoke individual thereto and located immediately above the same to be in line therewith. Each yoke straddles an opening 240 in line with the corresponding table section 9, this opening being sufficiently large to permit of the free passage of the bottle neck therethrough. Each yoke carries a chuck 241 also constituting a bottle positioner and which is in the form of a shell in line with the corresponding underlying table section 9. The chucks are somewhat in the shape of bells that are flared at their lower ends and which are slotted at their lower ends to be spring-like. When the table sections 9 are elevated to a predetermined extent, the mouth ends of the bottles and the caps thereon are snugly received in the chucks so that the bottles and their caps are properly centered with respect to the wire or string applying mechanism of my invention. Each yoke carries a horse-shoe or looped shaped guide 242 formed with a wire receiving groove 243, the spaces within these guides being aligned with the corresponding chucks 241 and table sections 9. The loop shaped guide 242 is in alignment with the underlying bottle supporting table section when this table section is brought to rest to have the closure cap secured to the mouth of the bottle on this table section. Each chuck 241 and guide 242 is in association with the wire shaping and applying mechanism of my invention, there being one such mechanism individual to each such chuck and guide, numerals applied to each such mechanism being similarly applied to other of such mechanisms. Each wire applying mechanism, in addition to the guide 242, also employs two holders preferably in the form of grippers constructed as illustrated in Fig. 49. Each gripper is inclusive of a jaw 244 integrally formed with a gripper supporting arm 245 and a jaw 246 complemental to the jaw 244 and pivotally connected therewith by the pin 247. The jaw 246 of each gripper is formed with a cylindrical opening 248 through the front half thereof. The strand of wire 249 which is fed from the reel 250 and is threaded through the openings 248 is received in the corresponding groove 243 to form a loop which is initially U-shaped as shown in Fig. 50. When the strand of wire has received this initially U-shaped loop, it is severed by the knife 251 to make the loop of desired length and to give the loop its second free end, it being preferable to have two free ends upon the loop before exercising the twisting operation thereof. The wire cutting operation will be later more fully set forth. The loop which is formed in the strand is in a plane which is angular to the axis of the neck of the bottle on the positioner in order to receive said bottle neck when the positioner and loop forming mechanism have been suitably relatively adjusted along the bottle axis. After the loop has been severed, the ends thereof are twisted together, by mechanism which will be described, to form the loop into a ring and to contract the ring about the skirt of the cap.

After the wire cutting operation, the gripper or holder supporting arms 245 are moved from the initial positions shown in Fig. 50 to their crossed relation shown in Fig. 52 in which operation the jaws 246 are turned by the wire from their positions shown in Fig. 50 to the positions thereof shown in Figs. 52 and 53 whereby the ends of the wire loops are gripped. To ensure the hold of the grippers upon the ends of the wire loop, these loop ends are bent as indicated at 252. The bending of the wire is caused by the shoes 253, 254 which are carried upon the support 30 the shoe 253 being carried by and integrally formed with the wire guide 255 that directs the wire from the corresponding reel 250, while the shoe 254 is carried by the corresponding yoke 239. The gripper arms, in being crossed, tightly encircle the wire loop about the corresponding bottle cap, the bends at 252 in the wire preventing the wire from being withdrawn from the grippers. After the gripper arms have been crossed to cross the sides of the loop as indicated in Fig. 52, the gripper arms are turned to twist the wire as indicated in Fig. 53, the gripper arms being turned, say, to twist the wire twice, as indicated in Fig. 53. After the wire has been twisted as indicated in Fig. 53, the rotation of the gripper arms is stopped whereafter they are uncrossed, as indicated in Fig. 54. In this uncrossing operation, the twisting of the wire loses one-half of a turn and the bends at 252 are somewhat straightened. When the gripper arms are uncrossed, the jaws 246 are brought into their initial adjustment to permit of the passage of the wire therethrough, Figs. 50 and 54, by means of the stops 256 carried by the yoke 239.

The mechanism for operating the grippers and the knife 251 and the mechanism for feeding the wire will now be described. Each cycle of operations commences with the bottle that is placed upon the tabe section 9 by the star wheel 8, that is, each cycle of operations commences with the bottle that is in the extreme left hand position with the table section 9, that supports the bottle, in its lowermost position. The table 10, together with its movable sections 9, and the support 30 are rotated together constantly and at a uniform rate. During the first portion of the turning movement of said table and support, about one-eighth of a revolution, the table section 9 which supports the left-hand bottle is raised by the cam track 20. During the next one-eighth of the revolution of said table and support, the wire is caused to be fed from the reel 250 that is individual to said raised table section 9. Each mechanism for feeding wire is inclusive of grooved wire feeding discs 257 and 258 turning in the same plane with the wire grooves thereof matching to receive the wire together, meshing spur gears 259 and 260 respectively fixed upon and coaxial with said discs, a shaft 261 carrying the disc 258 and spur gear 260, a bevel pinion 262 fixed upon the shaft 261, a bevel pinion 263 meshing with the pinion 262, a mutilated spur pinion 264 fixed upon the shaft that carries the pinion 263, and the stationary arcuate gear segment or rack 265 carried by the normally stationary gear carrier 266, this gear carrier being carried by the sleeves 235 so that it may be adjusted together with the support 30, to suit the height of bottles being operated upon. A bracket 267 carries the shafts upon which the elements 258 to 264 inclusive, of each wire feeding mechanism, are respectively fixed. A disc 268 is fixed upon and is coaxial with each mutilate pinion 264. The pinions 264 and rack 265 are in one zone and the discs 268 are in another zone. Each disc 268 has a flattened edge portion 268' which is engageable with a normally stationary segmental track 269 in the same zone therewith, the track 269 and the rack 265 being coaxial. During the rotation of the support 30 and table 10, the mutilated pinions 264 are brought into mesh with the rack 265, this meshing occurring during the second one-eighth revolution of said support and table. During this one-eighth of a revolution, the wire feeding discs 257 and 258 are turned to feed the wire through the guide 255 a length corresponding to the length of the loop of wire that is to be wrapped about a bottle neck. At the conclusion of this one-eighth of a revolution, the flattened side of the corresponding disc 268 is brought into engagement with the arcuate track 269 to prevent further rotation of the corresponding pinion 264 so that the corresponding wire feeding mechanism will be arrested from further feeding operation until the next cycle of operations. After the wire has been thus fed, the knife 251 is operated to shear the wire, this operation occurring during a few degrees of the succeeding turning movement of the table 10 and support 30. The knife 251 is carried by one end of the bell crank lever 270 which is pivoted at its elbow upon the bracket 271. The other end of the bell crank carries a roller 272. A spring 273 presses the bell crank in a counter-clockwise direction, Fig. 55, to an extent which is limited by the engagement of the lug 274 on the bell crank with the bracket 271. The various rollers 272 upon the various bell cranks 270 are normally positioned to be in the same zone by the various springs 273. A single cam post 275, common to all the rollers 272, is stationarily mounted upon the stationary gear carrier 266 and extends into the normal zone of the rollers 272 to an extent to depress the roller presented thereto sufficiently to move the corresponding knife 251 in a wire shearing direction. After the post 275 has been passed, the corresponding spring 273 restores the corresponding knife to normal position.

During the next few degrees of the turning movement of the table 10 and support 30, the gripper arms 245 are crossed. To this end the two gripper arms of each wire applying mechanism are journaled on spaced apart pins 276 carried by a head or support 277 which is preferably in the form of a rotatable yoke. The pivoted ends of the arms are provided with arcuate gear segments 278 that mesh with the racks 279 carried upon and preferably integrally formed with a reciprocable rod 280. When the arms are to be adjusted from the uncrossed position illustrated in Fig. 50 to the crossed position illustrated in Fig. 52, to interchange the positions of the grippers with respect to support 277, the rod 280 is moved inwardly and when the arms are to be uncrossed, said rod is moved outwardly. As the arms are being crossed, the angular ends thereof contact with the skirt of the cap 5 in the region where the wire is initially crossed so that the cap skirt is depressed at this place against the bottle neck. By this means, the cap skirt is prevented from bunching where the wire is crossed and sufficient clearance is afforded between the wire where crossed and the cap skirt to permit the twisting of the wire to come close against the cap skirt as illustrated in Fig. 52. Means for moving the rod 280 of each wire applying mechanism is inclusive of a fixed cam 281 having a cam groove receiving a roller 282 upon one end of an arm 283. The other end of this arm is coupled with a shaft 284 through the intermediation of an angular extension 285 provided upon the arm, a rod 286 passing through this angular extension, a spring 287 surrounding the rod and bearing at one end against a nut 288 on the rod, and an arm 289 fixed upon the shaft 284 and pressed upon by the other end of the spring 287. A square shaft 290 is received and slidable within a sleeve 291 having a square bore and carried upon the upper end of the extension 292 of the shaft 284. An arm 293 is fixed, at one end, upon the upper end of shaft 290 and carries a pin 294 at its other end. This pin 294 is received within an annular groove 295 formed in a collar 296 that is secured upon the corresponding rod 280. The shafts 284 pertaining to the various wire applying mechanisms on the machine are journaled in the bearing support 28 to turn with respect thereto and to travel therewith. The cam 281 being stationary, the rods 280 of the various wire applying mechanisms are lineally moved at proper intervals to cross and uncross the gripper arms 245.

The gripper arms which have been crossed to draw the loop tightly against and almost completely about the bottle neck, as indicated in Fig. 52, are together turned to twist the wire whereafter these arms are uncrossed. The mechanism for turning each pair of gripper arms is inclusive of the head or support 277, the sleeve extension 294 in which sleeve extension the corresponding rod 280 is slidable, the roller bearing 296 in which said sleeve extension is journaled, this roller bearing being mounted upon the support 30, the mutilated bevel pinion 299 fixed upon said sleeve extension and employed to turn such extension to turn the corresponding gripper arms at the proper time, the arcuate or segmental rack 300 upon the normally stationary gear carrier 266, the disc 301 also fixed upon said sleeve extension 297 and located alongside of said pinion 299, and the segmental arcuate track 302 located in a different circle from the circle that contains the rack 300, these circles being coaxial. When the support 30 has been turned sufficiently to complete the crossing of the jaws, the pinion 299 that is to be operated in the cycle of operations being described, engages the rack 300 whereby the corresponding head 277 is turned to turn the gripper arms to twist the wire as indicated in Fig. 53. When the gripper arms have been turned twice, the flattened edge of the disc 301 is brought into engagement with the track 302 to prevent the pinion 299 from being further turned in order to arrest further rotation of said arms.

In Fig. 56, rack 300 is not illustrated in the position it actually occupies in Fig. 51 but is so shown for sake of illustration, Fig. 56 being correct in this respect if it is not coupled with Fig. 51. In Fig. 56, the pinion 299 is entering upon its revolution.

The twisting revolutions of the gripper arms are concluded shortly after the first half of the cycle of operations being described has been completed. During the succeeding few degrees of turning movement of the support 30, the arms, which are not now being revolved, are uncrossed by the outward movement of the corresponding rod 280, a result which is due to the coaction of the cam elements 281 and 282 which control said rod in the manner hitherto described. By the time the support 30 has completed three-quarters of its revolution, the bottle having the cap secured thereto by the twisted wire is lowered, the corresponding cam roller 21 then riding down on the cam track 20. During the remaining quarter of the revolution of the support 30, the fully capped bottle is discharged from the table 10 by the star wheel 303, this star wheel serving to transfer the bottle to the table 2 from where it can be removed by an attendant.

The table 10 with its section 9 is preferably rotated to bring the bottle to the various stations at which the wire is fed, cut, twisted and released from the grippers or holders; but the invention is not to be limited to the direction of travel of the bottles and the table members 9 to the various stations where the wire is operated upon in the manner described.

What I claim is:

1. In a wire working machine for wiring skirted hoods over the mouths of bottles, said machine including a central shaft and a rotary supporting means for a plurality of bottles arranged concentrically with respect to said shaft and driven thereby; means whereby bottles are conveyed to said rotary support; means to remove sealed bottles therefrom; a plurality of spools of wire concentrically arranged with respect to said shaft; means to elevate said bottle to sealing position; means to automatically feed a predetermined length of wire from a spool to a wire shaping means; means operating on said wire to give said wire an initial U-shaped formation before severing a predetermined length of wire from a spool; means for severing said lengths of wire from said spool; means to restrict portions of the hood in overlapping position against the bottle neck below the mouth thereof; means whereby said initially U-shaped wire is interlocked to final sealing position to secure the hood in said restricted position, and means to bend end portions of said wire to facilitate manual removal of said wire.

2. In a wire working machine for wiring skirted hoods over the mouths of bottles, said machine including a central shaft and a rotary supporting means for a plurality of bottles arranged concentrically with respect to said shaft and driven thereby; means to receive and center a bottle to be sealed; means to elevate said bottle to sealing position; supporting means for a plurality of spools of wire concentrically arranged for rotation about said central shaft; means whereby relative vertical movement between said supporting means and said wire supporting means to accommodate various sizes of bottles is effected; mechanism for automatically withdrawing a length of wire from a spool including means operating on said wire to give the wire a curved shape on the bottle, and operating to restrict a portion of the hood in folded position against the bottle neck below the mouth thereof, and to fasten together portions of said wire to secure said portion of said hood in said restricted folded position, said mechanism including means whereby end portions of said wire are bent; and means for severing said lengths of wire from said spool to provide an extension containing said bent end portion to facilitate manual removal of said wire.

3. In a wire working machine for wiring skirted hoods over the mouths of bottles, said machine including a central shaft and a rotary supporting means for a plurality of bottles arranged concentrically with respect to said shaft and driven thereby; means to receive a bottle and skirted hood to be sealed thereon; means to relatively locate said bottle and co-operative elements of said machine in sealing position; supporting means for a plurality of spools of wire concentrically arranged for rotation about said central shaft; mechanism for effecting relative vertical movement between said supporting means and said wire supporting means to accommodate various sizes of bottles; means associated with each bottle receiving means for automatically withdrawing a length of wire from a spool and winding a substantial part of said length of wire about the skirt portion of said hood to constrict it in folded position against the neck of said bottle below the mouth thereof, including means operating to overlap and fasten together portions of said wire to secure said skirt portion in said restricted folded position; and means for severing said lengths of wire from said spool.

OLOF N. TEVANDER.

CERTIFICATE OF CORRECTION.

Patent No. 2,126,840.  August 16, 1938.

OLOF N. TEVANDER.

It is hereby certified that error appears in the printed specification of the above numbered patent requiring correction as follows: Page 3, second column, line 64, after the word "crank" insert lever; and line 71, for "of" read to; page 4, first column, line 55, strike out the word "to"; page 9, second column, line 24, for "tabe" read table; and line 58, for the word "mutilate" read mutilated; and that the said Letters Patent should be read with this correction therein that the same may conform to the record of the case in the Patent Office.

Signed and sealed this 4th day of October, A. D. 1938.

Henry Van Arsdale (Seal)  Acting Commissioner of Patents.

1. In a wire working machine for wiring skirted hoods over the mouths of bottles, said machine including a central shaft and a rotary supporting means for a plurality of bottles arranged concentrically with respect to said shaft and driven thereby; means whereby bottles are conveyed to said rotary support; means to remove sealed bottles therefrom; a plurality of spools of wire concentrically arranged with respect to said shaft; means to elevate said bottle to sealing position; means to automatically feed a predetermined length of wire from a spool to a wire shaping means; means operating on said wire to give said wire an initial U-shaped formation before severing a predetermined length of wire from a spool; means for severing said lengths of wire from said spool; means to restrict portions of the hood in overlapping position against the bottle neck below the mouth thereof; means whereby said initially U-shaped wire is interlocked to final sealing position to secure the hood in said restricted position, and means to bend end portions of said wire to facilitate manual removal of said wire.

2. In a wire working machine for wiring skirted hoods over the mouths of bottles, said machine including a central shaft and a rotary supporting means for a plurality of bottles arranged concentrically with respect to said shaft and driven thereby; means to receive and center a bottle to be sealed; means to elevate said bottle to sealing position; supporting means for a plurality of spools of wire concentrically arranged for rotation about said central shaft; means whereby relative vertical movement between said supporting means and said wire supporting means to accommodate various sizes of bottles is effected; mechanism for automatically withdrawing a length of wire from a spool including means operating on said wire to give the wire a curved shape on the bottle, and operating to restrict a portion of the hood in folded position against the bottle neck below the mouth thereof, and to fasten together portions of said wire to secure said portion of said hood in said restricted folded position, said mechanism including means whereby end portions of said wire are bent; and means for severing said lengths of wire from said spool to provide an extension containing said bent end portion to facilitate manual removal of said wire.

3. In a wire working machine for wiring skirted hoods over the mouths of bottles, said machine including a central shaft and a rotary supporting means for a plurality of bottles arranged concentrically with respect to said shaft and driven thereby; means to receive a bottle and skirted hood to be sealed thereon; means to relatively locate said bottle and co-operative elements of said machine in sealing position; supporting means for a plurality of spools of wire concentrically arranged for rotation about said central shaft; mechanism for effecting relative vertical movement between said supporting means and said wire supporting means to accommodate various sizes of bottles; means associated with each bottle receiving means for automatically withdrawing a length of wire from a spool and winding a substantial part of said length of wire about the skirt portion of said hood to constrict it in folded position against the neck of said bottle below the mouth thereof, including means operating to overlap and fasten together portions of said wire to secure said skirt portion in said restricted folded position; and means for severing said lengths of wire from said spool.

OLOF N. TEVANDER.

CERTIFICATE OF CORRECTION.

Patent No. 2,126,840. August 16, 1938.

OLOF N. TEVANDER.

It is hereby certified that error appears in the printed specification of the above numbered patent requiring correction as follows: Page 3, second column, line 64, after the word "crank" insert lever; and line 71, for "of" read to; page 4, first column, line 55, strike out the word "to"; page 9, second column, line 24, for "tabe" read table; and line 58, for the word "mutilate" read mutilated; and that the said Letters Patent should be read with this correction therein that the same may conform to the record of the case in the Patent Office.

Signed and sealed this 4th day of October, A. D. 1938.

Henry Van Arsdale (Seal) Acting Commissioner of Patents.